US011441048B2

(12) United States Patent
Dvorchak et al.

(10) Patent No.: US 11,441,048 B2
(45) Date of Patent: Sep. 13, 2022

(54) ONE COMPONENT UV CURABLE COMPOSITIONS AND METHODS FOR MAKING SAME

(71) Applicant: Dvorchak Enterprises LLC, Monroeville, PA (US)

(72) Inventors: Michael J. Dvorchak, Monroeville, PA (US); Michael E. Zupancic, McKees Rocks, PA (US)

(73) Assignee: Dvorchak Enterprises LLC, Monroeville, PA (US)

( * ) Notice: Subject to any disclaimer, the term of this patent is extended or adjusted under 35 U.S.C. 154(b) by 0 days.

(21) Appl. No.: 17/062,115

(22) Filed: Oct. 2, 2020

(65) Prior Publication Data

US 2021/0017415 A1 Jan. 21, 2021

Related U.S. Application Data

(63) Continuation of application No. PCT/US2019/053051, filed on Sep. 26, 2019.

(60) Provisional application No. 62/736,873, filed on Sep. 26, 2018.

(51) Int. Cl.
*C09D 133/08* (2006.01)
*C09D 175/14* (2006.01)
*C09D 133/14* (2006.01)
*B05D 3/06* (2006.01)

(52) U.S. Cl.
CPC ............. *C09D 133/08* (2013.01); *B05D 3/06* (2013.01); *C09D 133/14* (2013.01); *C09D 175/14* (2013.01)

(58) Field of Classification Search
CPC .. C09D 175/14; C09D 133/08; C09D 133/14; B05D 3/06
USPC ................ 522/96, 90, 97, 173, 174
See application file for complete search history.

(56) References Cited

U.S. PATENT DOCUMENTS

| | | |
|---|---|---|
| 2,914,982 A | 12/1959 | La Bossier |
| 3,124,605 A | 3/1964 | Wagner |
| 3,183,112 A | 5/1965 | Gemassmer |
| 4,188,472 A | 2/1980 | Chang |
| 4,324,879 A | 4/1982 | Bock et al. |
| 4,340,497 A | 7/1982 | Knopf |
| 4,429,082 A | 1/1984 | Lee et al. |
| 4,504,635 A | 3/1985 | Weber, Jr. et al. |
| 4,656,243 A | 4/1987 | Pedain et al. |
| 4,683,287 A | 7/1987 | Koleske et al. |
| 5,739,251 A | 4/1998 | Venham et al. |
| 5,767,220 A | 6/1998 | Venham et al. |
| 5,777,024 A * | 7/1998 | Killilea ................ C08G 18/671 427/372.2 |
| 5,914,383 A | 6/1999 | Richter et al. |
| 5,951,911 A | 9/1999 | Venham et al. |
| 6,465,539 B1 | 10/2002 | Weikard et al. |
| 6,534,128 B1 | 3/2003 | Carlson et al. |
| 6,838,177 B2 | 1/2005 | Fenn et al. |
| 7,268,172 B2 | 9/2007 | Bach et al. |
| 7,294,656 B2 | 11/2007 | Bach et al. |
| 9,073,296 B2 | 7/2015 | Facke et al. |
| 9,617,444 B2 * | 4/2017 | Dvorchak ............ C09D 175/16 |
| 10,100,223 B2 | 10/2018 | Jeffries et al. |
| 2003/0059555 A1 | 3/2003 | Fenn et al. |
| 2006/0052527 A1 | 3/2006 | Weikard et al. |
| 2006/0079660 A1 | 4/2006 | Ludewig et al. |
| 2006/0084713 A1 | 4/2006 | Bach et al. |
| 2006/0128923 A1 | 6/2006 | Roesler et al. |
| 2006/0205911 A1 | 9/2006 | Ludewig et al. |
| 2007/0191570 A1 | 8/2007 | Weikard et al. |
| 2007/0232751 A1 | 10/2007 | Ludewig et al. |
| 2014/0275320 A1 * | 9/2014 | Jefferies ............... C08G 18/755 522/111 |
| 2016/0002497 A1 | 1/2016 | Jeffries et al. |
| 2016/0009945 A1 | 1/2016 | Enomoto et al. |
| 2016/0090485 A1 * | 3/2016 | Schwalm ............. C07C 271/20 522/42 |
| 2018/0307138 A1 | 10/2018 | Bilinsky |

FOREIGN PATENT DOCUMENTS

| | | |
|---|---|---|
| DE | 1570540 | 3/1970 |
| DE | 1770245 | 10/1971 |
| DE | 2446440 A1 | 4/1976 |
| DE | 2914982 A1 | 10/1980 |
| DE | 3717060 A1 | 12/1988 |
| EP | 0798299 A1 | 10/1997 |
| EP | 0916647 A2 | 10/1998 |
| KR | 10-1409964 B1 | 6/2014 |
| WO | 9704881 A1 | 2/1997 |
| WO | 03027162 A1 | 4/2003 |
| WO | 2017063040 A1 | 4/2017 |

OTHER PUBLICATIONS

PCT Notification, International Search Report and The Written Opinion of the International Searching Authority, dated Jun. 4, 2020, 16 pages.
PCT Notification concerning Transmittal of International Preliminary Report on Patentability, International Preliminary Report on Patentability, dated Apr. 8, 2021, 8 pages.
Ellis-Terrell, CA., Poenitzsch, V., Wei R., Coulter, K., Miller, M. A., Musgrove G., Krouse, C., Simpson, J. G., Designing Superhydrophobic Coatings for Aircraft Drag Avoidance, 55th AIAA Aerospace Sciences Meeting, dated Jan. 9-13, 2017, AIAA SciTech Forum, 5 pages.

(Continued)

*Primary Examiner* — Sanza L. McClendon
(74) *Attorney, Agent, or Firm* — Barley Snyder

(57) ABSTRACT

A composition is provided and includes an unsaturated (meth)acrylate polymer or oligomer, an allophanate unsaturated urethane (meth)acrylate, a lactone-containing (meth)acrylate, a first reactive diluent, an adhesion promoter, a second reactive diluent, a light stabilizer, and a photoinitiator.

20 Claims, No Drawings

(56) References Cited

OTHER PUBLICATIONS

Bilinsky, H. C., Riblet Microfabrication Method for Drag Reduction in AIAA-2017-0047, 55th AIAA Aerospace Sciences Meeting, dated Jan. 8-12, 2017 AIAA SciTech Forum, (AIAA 2017-0047); Bilinsky, H. C. & Wilson, R. N., Maturation of Direct Contactless Microfabrication for Application of Drag Reducing Riblets, 2018 AIAA Aerospace Sciences Meeting, AIAA SciTech Forum, AIAA Mar. 21, 2018, 6 pages.
Bilinsky, H. C., Direct Contactless Microfabrication of 3D Riblets: Improved Capability and Metrology, Copyright 2019, AIAA Aerospace Sciences Meeting, AIAA SciTech Forum, AIAA Mar. 24, 2019, 5 pages.

\* cited by examiner

ONE COMPONENT UV CURABLE COMPOSITIONS AND METHODS FOR MAKING SAME

CROSS-REFERENCE TO RELATED APPLICATIONS

This application is a continuation of PCT International Application No. PCT/US2019/053051 filed Sep. 26, 2019, which claims priority under 35 U.S.C. § 119 to U.S. Provisional Application No. 62/736,873, filed Sep. 26, 2018.

FIELD OF INVENTION

The present disclosure generally relates a composition and, more particularly, to a one component ultra violet (UV) cure composition used in coatings.

BACKGROUND

One component ultra violet (UV) curable polyurethane coatings have long been used in coating, adhesive and sealant compositions, and more recently have found utility in specialty applications such as in the manufacture and application of drag-reducing coatings on aircraft, boats, trucks and automobiles as in accordance with, for example, U.S. Pat. Pub. No. 2018/0307138 (also International Patent Publication Number WO2017063040A).

However, current UV curable polyurethane materials used in such drag-reducing coatings suffer from several practical deficiencies. For example, current uncured compositions have very high viscosities, between 10,000 cps and 200,000 cps at room temperature, which can lead to difficulties in handling and processing. Additionally, current UV curable polyurethane compositions suffer from oxygen inhibition during UV curing, which leads to uncured material on the outer surface of the coating. To mitigate against oxygen inhibition, the coatings must either be cured in an inert atmosphere or a cover is placed over the uncured material, to prevent oxygen from reaching the surface of the material. In the event such techniques are not used, uncured material must be removed by conventional techniques, such as a solvent wipe with spirit wipe P850-1402 as described in U.S. Pat. No. 6,838,177, prior to use of the cured one component UV curable polyurethane coating. In addition, UV-A light is needed to cure the material by a 250 W iron doped metal halide lamp that provides UV-A output at 320 nm and 400 nm.

Further refinements to this low intensity UV cure technology led to the development of a composition described U.S. Pat. No. 7,268,172 did not require a solvent wipe of the exposed surface after curing. This technology utilized UV-A light sources in the 320 nm and 450 nm range. The solvent wipe required in U.S. Pat. No. 6,838,177 was due to poor cross-linking at the surface due to oxygen at the air surface coating surface interface becoming inhibited due to free radical chain termination by ambient oxygen. For both of these efforts, as described in U.S. Pat. Nos. 6,838,177 and 7,268,172, low molecular weight acrylate monomers and solvents were needed to reduce the high molecular weight oligomers to the proper use level viscosity so that they could be spray applied. These solvents added to the formulation resulted in the emissions of volatile organic compounds (VOCs) and hazardous air pollutants (HAPs).

In addition to the above refinements, flexibility issues occur since the UV-A crosslinked material was too brittle to pass many of the required flexibility tests required by the transportation industry. As disclosed in U.S. Pat. Nos. 7,294,656 and 10,100,223, the requirement to meet a more flexible UV cure coatings were developed. These flexible UV cure systems were needed developments for meeting automotive and Chemical Mechanical Polishing (CMP) of micro-chips performance specifications. However, in both applications the polymer backbone needed to cure these more flexible UV cure elastomers required significant amounts of UV cure energy to cure while still being able to override the oxygen inhibition issues discussed above. For the automotive UV cure performance (U.S. Pat. No. 7,294,656), the amount of energy required to cross link the semi-elastomeric UV cure coating was 0.1 to 10 Watts/cm2 while the CMP elastomeric UV cure coating required 4.4 watts/cm2 (U.S. Pat. No. 10,100,223). In light of the drag-reducing coatings on aircraft, the UV cure coating must have even better performance than automotive applications. This requirement looked unobtainable since the low UV cure energy being taught in International Patent Publication Number WO2017063040A was a very low UV cure output of only 0.05 Watts/cm2. However; through the synergistic effect utilizing the best oligomers, monomers, and photoinitiators, we were surprisingly able to develop and cure a successful drag-reducing coatings for aircraft at this very low energy level of 0.05 Watts/cm2.

Within the realm of the development of the International Patent Publication WO2017063040A, there was a realization that the riblets designed for successful drag-reducing coatings for aircraft will become fouled due to in service dirt, hydraulic fluid or other FOD materials. This fouling of the riblet would increase drag. The intended recipients of this drag-reducing coatings are medium altitude long endurance aircraft (MALE) for the US Military as well as commercial aviation. It is extremely important that a superhydrophobic riblet be developed that prevents fouling over the programmed depot maintenance (PDM) cycle. These superhydrophobic riblet drag-reducing coatings have already been proposed (see Ellis-Terrell, C A., Poenitzsch, V., Wei, R., Coulter, K., Miller, M. A., Musgrove, G., Krouse, C., Simpson, J. G., *Designing Superhydrophobic Coatings for Aircraft Drag Avoidance*, 55$^{th}$ AIAA Aerospace Sciences Meeting, 2017 AIAA SciTech Forum) but are designed to be added to the riblet structures after they are formed via the UV cure coatings process.

Many of these technologies use fluorinated additives or compounds to decrease surface energy. Some systems use fluorinated additives that are not tied chemically to the polymer network, others use a fluorinated compound that has a chemical bond in the functional molecule. An example of the latter chemistry is the advanced per advanced performance coatings (APC) two component fluorinated polyurethane used by the USAF. The fluorinated compound is attached to the hydroxyl portion of the molecule. When the system crosslinks with the polyisocyanate the fluorine molecule is physically tied to the polyurethane matrix. The result is a molecule which cannot leach from the coating and the resultant film lasts the full length of a PDM cycle.

The surprising development was a riblet that was developed around a superhydrophobic acrylate chemistry. It is believed this superhydrophobic acrylate chemistry of the riblet coating will prolong the drag reduction effect of the riblet structure grooves by minimizing fouling of the grooves by dirt, hydraulic fluid or other foreign object debris (FOD) materials. The present disclosure formulations are leading edge superhydrophobic acrylate technology that are chemically bound within the final UV cure polymer coating.

Thus, there is a need to improved methods for making one component UV curable polyurethane coatings for use in drag-reducing coatings for aircraft, boats, trucks and/or automobiles, particularly one component UV curable coatings that are capable of use as coatings that can be cured into microstructure patterns, such as riblets and the like, per the description of WO2017063040A with a 405 nm laser diode with a power output of up to 50 mW. Such structured riblets (see Bilinsky, H. C., Riblet Microfabrication Method for Drag Reduction in AIAA-2017-0047, 55th AIAA Aerospace Sciences Meeting, 2017 AIAA SciTech Forum, (AIAA 2017-0047); Bilinsky, H. C. & Wilson, R. N., *Maturation of Direct Contactless Microfabrication for Application of Drag Reducing Riblets,* 2018 AIAA Aerospace Sciences Meeting, AIAA SciTech Forum, (AIAA 2018-0321); and Bilinsky, H. C., *Direct Contactless Microfabrication of* 3D Riblets: Improved Capability and Metrology, 2019 AIAA Aerospace Sciences Meeting, AIAA SciTech Forum, (AIAA 2019-0324)) can be of the following variety: sawtooth riblet geometry, scalloped riblet geometry, and a blade riblet geometry. Such one component UV curable polyurethane coatings are also suitable in so-called bottom up curing as described in WO2017063040A.

Further, the there is a need to improved methods for making one component UV curable polyurethane coatings for use in drag-reducing coatings for aircraft, boats, trucks and/or automobiles; UV curable one component aerospace coatings that have ultra-low VOC and VHAPs, exhibit improved weathering performance in a clear or pigmented form; are capable of being cured without the need of any special procedures to mitigate oxygen inhibition, and have extremely low surface energy that results in self-cleaning performance.

SUMMARY

In view of the aforementioned, a composition is provided and generally includes an unsaturated (meth)acrylate polymer or oligomer, an allophanate unsaturated urethane (meth)acrylate, a lactone-containing (meth)acrylate, a first reactive diluent, an adhesion promoter, a second reactive diluent, a light stabilizer, and a photoinitiator. The unsaturated (meth)acrylate polymer or oligomer is provided in an amount of about 25 to about 45 percent by weight and generally includes an organic polyisocyanate, a polyol, and at least one of: (1) a hydroxyl-functional (meth)acrylate and (2) an unsaturated (meth)acrylate polyol. The allophanate unsaturated urethane (meth)acrylate is provided in an amount of about 5 to about 25 percent by weight. The lactone-containing (meth)acrylate is provided in an amount of about 2 to about 12 percent by weight. The first reactive diluent is provided in an amount of about 15 to about 50 percent by weight, the first reactive diluent having a monomer. The surfactant is provided in an amount up to about .3 percent by weight. The adhesion promoter is provided in an amount of about 1 to about 5 percent by weight. The second reactive diluent is provided in an amount of about 1 to about 5 percent by weight. The light stabilizer is provided in an amount of about 0.5 to about 2 percent by weight, and the photoinitiator is provided in an amount of about 0.5 to about 15 percent by weight.

DETAILED DESCRIPTION OF THE EMBODIMENTS

Various embodiments are described and illustrated in this specification to provide an overall understanding of the structure, function, operation, manufacture, and use of the disclosed products and processes. It is understood that the various embodiments described and illustrated in this specification are non-limiting and non-exhaustive. Thus, the disclosure is not limited by the description of the various non-limiting and non-exhaustive embodiments disclosed in this specification. Rather, the disclosure is defined solely by the claims. The features and characteristics illustrated and/or described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. Therefore, any such amendments comply with the requirements of 35 U.S.C. § 112, first paragraph, and 35 U.S.C. § 132(a). The various embodiments disclosed and described in this specification can include, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout this specification to "certain embodiments", "some embodiments, "various non-limiting embodiments," or the like, means that a particular feature or characteristic may be included in an embodiment. Thus, use of such phrases and similar phrases, in this specification does not necessarily refer to a common embodiment, and may refer to different embodiments. Further, the particular features or characteristics may be combined in any suitable manner in one or more embodiments. Thus, the particular features or characteristics illustrated or described in connection with various embodiments may be combined, in whole or in part, with the features or characteristics of one or more other embodiments without limitation. Such modifications and variations are intended to be included within the scope of the present specification. In this manner, the various embodiments described in this specification are non-limiting and non-exhaustive.

In this specification, other than where otherwise indicated, all numerical parameters are to be understood as being prefaced and modified in all instances by the term "about", "in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges subsumed within the recited range. For example, a range of ".1 to 10" is intended to include all sub-ranges between (and including) the recited minimum value of .1 and the recited maximum value of 10, that is, having a minimum value equal to or greater than .1 and a maximum value equal to or less than 10. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112, first paragraph, and 35 U.S.C. § 132(a).

The grammatical articles "one", "a", "an", "and "the", "as used herein, are intended to include "at least one" or "one or more", "unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

As used herein, "(meth)acrylate" encompasses acrylates and methacrylates. As used herein, "polymer" encompasses prepolymers, oligomers and both homopolymers and copolymers; the prefix "poly" refers to two or more.

The present disclosure is, in some embodiments, directed to methods of making a one component UV cured coating. These methods preferably may include: (1) applying a composition to a substrate at a composition thickness of at least .1 mils, such as at least 10 mils, at least 20 mils, at least 30 mils, at least 40 mils, at least 50 mils, or in some cases, at least 60 mils and/or, in some cases, no more than 100 mils; (2) exposing the composition actinic radiation, such as ultraviolet ("UV") radiation having, for example, a wavelength of 320 to 450 nm to produce a cured film; and (3) removing the uncured material from the substrate, such as by removing the uncured material with a solvent developer, pulling, cutting, and/or peeling. In other embodiments, the methods of the present disclosure may include as using one or more of the preferred compositions of the present disclosure in the manufacture and application of drag-reducing coatings on aircraft, boats, trucks and/or automobiles as in accordance with, for example, International Patent Publication Number WO2017063040A. In some preferred embodiments of the present disclosure, no oxygen inhibition mitigation techniques are used, such as the use of an inert atmosphere or a cover sheet.

In certain embodiments, the composition used in the present disclosure include a urethane (meth)acrylate polymer that is a reaction product of a composition including: (i) an organic polyisocyanate, (ii) a polyol having a number average molecular weight of from 600 to 4000 g/mol, and at least one of (iii) (1) a hydroxyl-functional (meth)acrylate, and (2) an unsaturated (meth)acrylate polyol based on a polyester, polyether, polythioether, polyacetal, polycarbonate, dimer fatty alcohol and/or an esteramide and having a number average molecular weight of 400 to 8000 g/mol, such as an unsaturated (meth)acrylate polyol that is polyether, polyester and/or polycarbonate based and has an OH number of from 30 to 500, such as 100 to 400 or 100 to 300. In some cases, the unsaturated (meth)acrylate polyol is prepared by reacting a polyether or polyester or polycarbonate di- or polyol with (meth)acrylic at an isocyanate to hydroxyl equivalent ratio of from 0.5:1 to 1:0.5, such as 0.9:1 to 1:0.9, such as 1:1.

In some embodiments of the present disclosure, the foregoing urethane (meth)acrylate polymer is a reaction product of a composition including: (i) an organic polyisocyanate; (ii) a polyol having a number average molecular weight of from 600 to 4000 g/mol; and (iii) at least one of: (1) a hydroxyl-functional (meth)acrylate, such as a mono-, di-, tri- or poly-hydroxyl-$C_1$-$C_{10}$-alkyl or $C_6$-$C_{10}$-aryl (meth)acrylate, and (2) an unsaturated (meth)acrylate polyol based on a polyester, a polyether, a polythioether, a polyacetal, a polycarbonate, a dimer fatty alcohol and/or an esteramide, in each case with a number average molecular weight of 400 to 8000 g/mol, wherein (1) is present in an amount of 0 to 100% by weight, such as 10 to 90% by weight, and/or (2) is present in an amount of 0 to 100%, such as 10 to 90% by weight, wherein these weight percentages are based on the total weight of components (1) and (2) and, in some cases, total 100%. In some embodiments, the composition used to prepare the foregoing urethane (meth)acrylate has an isocyanate to hydroxyl equivalent ratio of from 0.5:1 to 1:0.5, such as 0.9:1 to 1:0.9, such as 1:1.

Suitable organic polyisocyanates for use as component (i) in preparing the urethane (meth)acrylate polymer include those having aliphatically, cycloaliphatically and/or aromatically bound isocyanate groups, such as those with a molecular weight of from 144 to 1000 g/mol, such as from 168 to 300 g/mol. Suitable examples include butylene diisocyanate, hexamethylene diisocyanate (HDI), isophorone diisocyanate (IPDI), 3(4)-isocyanatomethyl-methylcyclohexyl isocyanate (IMCI), trimethylhexamethylene diisocyanate (2,2,4 and/or 2,4,4-trimethyl-hexamethylene diisocyanate), the isomeric bis(4,4'-isocyanato-cyclohexyl)methanes ($H_{12}$MDI), the isomeric bis(isocyanatomethyl)-methylcyclohexanes, isocyanatomethyl-1,8-octane diisocyanate, 1,4-cyclohexylene diisocyanate, 1,4-phenylene diisocyanate, 2,4- and/or 2,6-toluoylene diisocyanate (TDI), 1,5-naphthylene diisocyanate, 2,4'- and/or 4,4'-diphenylmethane diisocyanate (MDI), triphenylmethane-4,4',4"-triisocyanate or their derivatives having a urethane, isocyanurate, allophanate, biuret, uretdione, iminoooxadiazinedione structure and/or mixtures thereof as well as mixtures of aliphatic and aromatic diisocyanates and/or polyisocyanates. The production of such derivatives is known and described, for example, in U.S. Pat. Nos. 3,124,605, 3,183,112, 3,919,218, and 4,324,879 and in European Pat. No. EP 798 299.

In some cases, HDI, IPDI, TDI, $H_{12}$MDI and/or isocyanurate group-containing polyisocyanates obtained by trimerization of HDI, TDI or IPDI are used.

In certain embodiments, the polyol used as component (ii) in preparing the urethane (meth)acrylate polymer has a number average molecular weight of from 600 to 4000 g/mol, such as 800 to 3000 g/mol, or some cases, 1000 to 2000 g/mol. Exemplary suitable polyols include, for example, polymeric polyols, such as diols, triols, and higher functionality polyols, including, but not limited to, polyether polyols, polyester polyols, and/or polycarbonate polyols, among others.

Suitable polyether polyols include, for example, alkylene glycols, such as polyethylene glycol, polypropylene glycol, and/or polytetramethylene ether glycol, and include those prepared by reacting a suitable alcohol (such as ethylene glycol, propylene glycol, butanol, glycerol, trimethylol propane, hexane diol, pentaerythritol and the like) with an alkylene oxide, such as ethylene oxide and/or propylene oxide.

Suitable polyester polyols include those prepared by polycondensation of an alcohol, such as, for example, ethylene glycol, propylene glycol, butanol, glycerol, trimethylol propane, hexane diol, and/or pentaerythritol with a diacid and/or anhydride, such as adipic, fumaric, maleic, terephthalic, isophthalic, phtalic acids and the like, anhydrides thereof, and/or a mixture thereof. In certain embodiments, the polyester polyol is prepared from components including (a) 54 to 58 mol % of a polyol component and (b) 46 to 42 mol % of a dicarboxylic acid component, wherein (1) the polyol component includes (i) 70 to 90 mol % of hexane-1,6-diol and (ii) 10 to 30 mol % of at least one higher valent alcohol selected from trimethylolpropane, glycerol, pentaerythritol and mixtures of these polyols, and (2) the dicarboxylic acid component includes (i) 50 to 80 mol % of isophthalic acid, (ii) 20 to 30 mol % of at least one dicarboxylic acid of the formula $HOOC—(CH_2)_n—COOH$ (n=an integer from 2-8) and (v) 0 to 20 mol % of at least one dicarboxylic acid or at least one dicarboxylic acid anhydride selected from terephthalic acid, phthalic acid, phthalic acid anhydride, tetrahydrophthalic acid, tetrahydrophthalic acid anhydride, hexahydrophthalic acid and hexahydrophthalic acid anhydride, as are described in U.S. Pat. No. 4,656,243 at col. 3, ln. 15 to col. 4, ln. 25, the cited portion of which being incorporated herein by reference.

Suitable polycarbonate polyols include, for example, polycondensation reaction products of polyhydric alcohols and phosgene or polycondensation reaction products of polyhydric alcohols and diesters of carbonic acid, wherein suitable polyhydric alcohols include, for example, diols such as 1,3-propanediol; ethylene glycol; propylene glycol; 1,4-propanediol; diethylene glycol; triethylene glycol; tetraethylene glycol; 1,4-butanediol; 1,6-hexanediol; trimethylene-pentanediol; 1,4-cyclohexanediol; 1,4-cyclohexanedimethanol; neopentyl glycol; 1,8-octanediol; and combinations of any thereof, as well as tri-functional and multi-functional hydroxyl compounds such as glycerol; trimethylolpropane; trimethylolethane; hexanetriol isomers; pentaerythritol; and combinations of any thereof.

In certain embodiments, the polymeric polyol has an average hydroxyl functionality of 1 to 5, such as 2 to 4, 2.5 to 3.5. In certain embodiments, the polymeric polyol has an OH number of 25 to 350 mg KOH/g solids, such as 80 to 250 mg KOH/g solids, or, in some cases, 100 to 200 mg KOH/g solids.

Hydroxy-functional (meth)acrylates suitable for use as component (iii)(1) in preparing the urethane (meth)acrylate polymer include, for example, mono-, di-, tri-, or polyhydroxyl $C_1$ to $C_{10}$alkyl or $C_6$ to $C_{10}$-aryl (meth)acrylates, which can be prepared by reacting relatively low molecular weight diols, triols and polyols (such as ethylene glycol, propylene glycol, butanol, glycerol, trimethylol propane, hexane diol, pentaerythritol and the like) with acrylic and/or methacrylic acid in amounts such that the resultant product contains one or more hydroxyl groups. Specific examples of suitable mono-, di-, tri-, or polyhydroxyl $C_1$ to $C_{10}$alkyl or $C_6$ to $C_{10}$-aryl (meth)acrylates include, but are not limited to, hydroxyethyl (meth)acrylate, hydroxypropyl (meth)acrylate, hydroxybutyl (meth)acrylate, hydroxypropyl (meth) acrylate, hydroxyhexyl (meth)acrylate, triglycerol di(meth)acrylate, and/or dipentaerythritol penta(meth)acrylate.

Unsaturated polyether (meth)acrylates suitable for use as component (iii)(2) in preparing the foregoing urethane (meth)acrylate polymer can be prepared by reacting a polyether polyol (having an hydroxyl functionality of, for example, from 2 to 6) with a (meth)acrylic acid. Suitable polyether polyols are often prepared by reacting a suitable polyol such as, e.g., ethylene glycol, propylene glycol, butanol, glycerol, trimethylol propane, hexane diol, and pentaerythritol, and the like, with ethylene oxide, propylene oxide or a mixture thereof. In certain embodiments, when the unsaturated polyether (meth)acrylate is to be used to prepare the unsaturated urethane (meth)acrylate, the polyether is selected so as to produce the (meth)acrylate having the desired OH number and the components are reacted in amounts such that the resultant unsaturated polyether (meth)acrylate has an OH number of from 30 to 500, such as from 100 to 400, or, in some cases, from 100 to 300.

Unsaturated polyester (meth)acrylates suitable for use as component (iii)(2) in preparing the foregoing urethane (meth)acrylate polymer can be prepared by reacting a polyester polyol (having an hydroxyl functionality of from 2 to 6) with acrylic and/or methacrylic acid. Suitable polyester polyols are generally prepared by reacting a suitable starting glycol such as, e.g., ethylene glycol, propylene glycol, butanol, glycerol, trimethylol propane, hexane diol, pentaerythritol or a mixture thereof with diacids or anhydrides, such as adipic, fumaric, maleic, terephthalic, isophthalic, phtalic and the like, or a mixture thereof. In certain embodiments, when the unsaturated polyester (meth)acrylate is to be used to prepare the unsaturated urethane (meth)acrylate, the polyester is selected so as to produce the (meth)acrylate having the desired OH number and the components are reacted in amounts such that the resultant unsaturated polyester (meth)acrylate has an OH number of from 30 to 500, such as from 100 to 400 or, in some cases, from 100 to 300.

In certain embodiments, the foregoing urethane (meth)acrylate polymer is present in the composition in an amount of up to 90 percent by weight, up to 80 percent by weight, or, in some cases, up to 70 percent by weight, and/or at least 10 percent by weight, at least 20 percent by weight, or, in some cases, at least 30 percent by weight, the foregoing weight percents being based on the total weight of the composition.

In some embodiments, in addition to or in lieu of the previously described urethane (meth)acrylate polymer, the composition includes an allophonate urethane (meth)acrylate that is different from the urethane (meth)acrylate described above. Allophanate urethane acrylates can be prepared, for example, by reacting urethane groups of a urethane (meth)acrylate with a isocyanate groups of an isocyanate-functional component, such as a polyisocyanate or, alternatively, by reacting the urethane groups of a polyurethane with isocyanate groups of an isocyanate-functional (meth)acrylate. Suitable allophanate urethane acrylates, methods of their preparation, and components thereof are described in U.S. Patent Application Publication Nos. 2006/0052527, 2006/0079660, 2007/0191570, 2006/0205911, 2006/0128923 and 2007/0232751, and U.S. Pat. Nos. 5,951,911, 5,767,220 and 5,739,251, the entire contents of each of which are incorporated herein by reference.

In some embodiments, the allophanate unsaturated urethane (meth)acrylate polymer has a residual monomer content of less than 0.5% by weight and an NCO content of less than 1% by weight, and is prepared by reacting a composition including: (A) a compound containing isocyanate groups, (B) a hydroxy-functional compound which contains groups which react, with polymerization, with ethylenically unsaturated compounds on exposure to actinic radiation (radiation-curing groups) and (C) optionally further compounds containing NCO-reactive groups, (D) optionally in the presence of a catalyst used to form NCO-group-containing urethanes having radiation-curing groups, which are subsequently reacted, without further addition of compounds containing isocyanate groups, in the presence (E) of an allophanatization catalyst, the ratio of NCO groups of the compounds from (A) to the OH groups of the compounds from (B) and, where used, (C) being 1.45:1.0 to 1.1:1.0, such as 1.43:1.0 to 1.2:1.0, or, in some cases, 1.35:1.0 to 1.3:1.0. As used herein, "actinic radiation" refers to electromagnetic, ionizing radiation, especially electron beams, UV radiation and also visible light (Roche Lexikon Medizin, 4th edition; Urban & Fischer Verlag, Munich 1999). Groups which react, with polymerization, with ethylenically unsaturated compounds on exposure to actinic radiation (radiation-curing groups) are for the purposes of the present disclosure vinyl ether, maleyl, fumaryl, maleimide, dicyclopentadienyl, acrylamide, acrylate and/or methacrylate groups.

Suitable isocyanate-containing compounds (A) for use in preparing the allophonate unsaturated urethane (meth)acrylate polymer include aromatic, aliphatic and cycloaliphatic polyisocyanates, such as compounds of the formula Q(NCO)$_n$ having a molecular weight below 800 g/mole, in which n is a number from 2 to 4 and Q is an aromatic $C_6$-$C_{15}$ hydrocarbon radical, an aliphatic $C_4$-$C_{12}$ hydrocarbon radical or a cycloaliphatic $C_6$-$C_{15}$ hydrocarbon radical. Specific examples include, but are not limited to, diisocyanates, such as TDI, MDI, triisocyanatononane (TIN), naphthyl diisocyanate (NDI), 4,4'-diisocyanatodicyclohexylmethane, 3-isocyanatomethyl-3,3,5-trimethylcyclohexyl isocyanate, IPDI, tetramethylene diisocyanate, (HDI), 2-methylpentamethylene diisocyanate, 2,2,4-trimethylhexamethylene diisocyanate (THDI), dodecamethylene diisocyanate, 1,4-diisocyanatocyclohexane, 4,4'-diisocyanato-3,3'-dimethyldicyclohexylmethane, 2,2-bis(4-isocyanatocyclohexyl)propane, 3-isocyanatomethyl-1-methyl-1-isocyanato-cyclohexane (MCI), 1,3-diisooctylcyanato-4-methylcyclohexane, 1,3-diisocyanato-2-methylcyclohexane, α, α, α', α'-tetramethyl-m- or -p-xylylene diisocyanate (TMXDI), or a mixture thereof.

Likewise suitable as isocyanate-containing compounds (A) for use in preparing the allophonate unsaturated urethane (meth)acrylate are reaction products of the aforementioned isocyanates with themselves or with one another to form uretdiones or isocyanurates. Mention may be made by way of example of Desmodur® N3300, Desmodur® N3400 or Desmodur® N3600 (all Covestro AG Leverkusen, DE).

Also suitable as isocyanate-containing compounds (A) for use in preparing the allophonate unsaturated urethane (meth) acrylate are reaction products of the aforementioned isocyanates with other isocyanate-reactive compounds to form prepolymers. Such isocyanate-reactive compounds include, for example, polyols, such as polyether polyols, polyester polyols, polycarbonate polyols and polyhydric alcohols. As polyols it is possible to use hydroxyl compounds of relatively high molecular weight and, in minor amounts, hydroxyl compounds of low molecular weight as well.

Examples of suitable hydroxyl-containing compounds of component (B) for use in preparing the allophonate unsaturated urethane (meth)acrylate are 2-hydroxyethyl(meth)acrylate, polyethylene oxide mono(meth)acrylate (e.g. PEA6/PEM6; Laporte Performance Chemicals Ltd., UK), polypropylene oxide mono(meth)acrylate (e.g. PPA6, PPM5S; Laporte Performance Chemicals Ltd., UK), polyalkylene oxide mono(meth)acrylate (e.g. PEM63P, Laporte Performance Chemicals Ltd., UK), poly(.ε-caprolactone) mono(meth)acrylates such as, Tone M100® for example, (Dow, Schwalbach, DE), 2-hydroxypropyl(meth)acrylate, 4-hydroxybutyl(meth)acrylate, hydroxybutyl vinyl ether, 3-hydroxy-2,2-dimethylpropyl(meth)acrylate, the hydroxy-functional mono-, di- or where possible higher acrylates such as, for example, glyceryl di(meth)acrylate, trimethylolpropane di(meth)acrylate, pentaerythritol tri(meth)acrylate or dipentaerythritol penta(meth)acrylate, which are obtainable by reacting polyhydric, optionally alkoxylated alcohols such as trimethylolpropane, glycerol, pentaerythritol, dipentaerythritol.

Likewise suitable as a constituent of (B) for use in preparing the allophonate unsaturated urethane (meth)acrylate are alcohols obtained from the reaction of acids containing double bonds with epoxide compounds optionally containing double bonds, such as, for example, the reaction products of (meth)acrylic acid with glycidyl(meth)acrylate or bisphenol A diglycidyl ether.

Additionally it is likewise possible to use unsaturated alcohols which are obtained from the reaction of optionally unsaturated acid anhydrides with hydroxy compounds and epoxide compounds that optionally contain acrylate groups. By way of example these are the reaction products of maleic anhydride with 2-hydroxyethyl(meth)acrylate and glycidyl (meth)acrylate.

In some embodiments, (B) includes a compound having an OH functionality of from 0.9 to 1.1. In some embodiments, (B) includes hydroxyethyl(meth)acrylate, hydroxypropyl(meth)acrylate and/or hydroxybutyl(meth)acrylate.

It is possible to use further compounds (C), which are different from those of (B), and contain NCO-reactive groups such as OH, SH or NH groups, for example. These may be, for example, NH— or SH-functional compounds containing groups which react, with polymerization, with ethylenically unsaturated compounds on exposure to actinic radiation.

Compounds which are non-reactive under exposure to actinic rays, such as polyether polyols, polyester polyols, polycarbonate polyols and polyhydric alcohols, for example, can also be used in addition to influence the product properties, as component (C). As polyols it is possible to use hydroxyl compounds of relatively high molecular weight and, in minor amount, hydroxyl compounds of low molecular weight as well.

Hydroxyl compounds of relatively high molecular weight include the hydroxy polyesters, hydroxy polyethers, hydroxy polythioethers, hydroxy polyacetals, hydroxy polycarbonates, dimer fatty alcohols and/or esteramides, in each case with number average molecular weights of 400 to 8000 g/mole, such as 500 to 6500 g/mole.

Low molecular weight polyols that can be used are, for example, polyols with a molecular weight of 62 to 399 g/mole, such as ethylene glycol, triethylene glycol, tetraethylene glycol, propane-1,2-diol and -1,3-diol, butane-1,4-diol and -1,3-diol, hexane-1,6-diol, octane-1,8-diol, neopentyl glycol, 1,4-bis(hydroxymethyl)cyclohexane, bis(hydroxymethyl)tricyclo[5.2.1.0$^{2,6}$]decane, 1,4-bis(2-hydroxyethoxy)-benzene, 2-methyl-1,3-propanediol, 2,2,4-trimethylpentanediol, 2-ethyl-1,3-hexanediol, dipropylene glycol, polypropylene glycols, dibutylene glycol, polybutylene glycols, bisphenol A, tetrabromobisphenol A, glycerol, trimethylolpropane, hexane-1,2,6-triol-butane-1,2,4-triol, pentaerythritol, quinitol, mannitol, sorbitol, methyl glycoside and 4,3,6-dianhydrohexitols.

Suitable polyether polyols include, for example, addition compounds or mixed addition compounds, prepared using starter molecules with a valency of two to six such as water or the abovementioned polyols or amines containing 1 to 4-NH bonds, of tetrahydrofuran, styrene oxide, ethylene oxide, propylene oxide, the butylene oxides or epichlorohydrin, particularly those of ethylene oxide and/or of propylene oxide, such as propylene oxide polyethers which contain on average 2 to 4 hydroxyl groups and which can contain up to 50% by weight of incorporated polyethylene oxide units.

Examples of suitable polyester polyols include reaction products of polyhydric, such as dihydric and optionally additionally trihydric alcohols, with polybasic, such as dibasic, carboxylic acids. In lieu of the free carboxylic acid it is also possible to use the corresponding polycarboxylic anhydrides or corresponding polycarboxylic esters of lower alcohols or mixtures thereof for preparing the polyesters. The polycarboxylic acids may be aliphatic, cycloaliphatic aromatic and/or heterocyclic in nature and may where appropriate be substituted, by halogen atoms for example, and/or unsaturated. By way of example mention is made of adipic acid, phthalic acid, isophthalic acid, succinic acid, suberic acid, azelaic acid, sebacic acid, trimellitic acid, phthalic anhydride, tetrahydrophthalic anhydride, glutaric anhydride, tetrachlorophthalic anhydride, endomethylenetetra-hydrophthalic anhydride, maleic anhydride, maleic acid, fumaric acid, dimeric and trimeric fatty acids such as oleic acid, optionally in a mixture with monomeric fatty acids, dimethyl terephthalate or bis-glycol terephthalate. In some embodiments, the hydroxy polyester melts at below 60.degree. C. and has 2 or 3 terminal OH groups.

Suitable polycarbonate polyols are obtainable, for example, by reacting carbonic acid derivatives, e.g. diphenyl carbonate, dimethyl carbonate or phosgene, with diols. Examples of suitable such diols include ethylene glycol, triethylene glycol, tetraethylene glycol, propane-1,2-diol and -1,3-diol, butane-1,4-diol and -1,3-diol, pentane-1,5-diol, hexane-1,6-diol, octane-1,8-diol, neopentyl glycol, 1,4-bis(hydroxymethyl)cyclohexane, bis(hydroxymethyl)tricyclo[5.2.1.0$^{2,6}$]decane or 1,4-bis(2-hydroxyethoxy)-benzene, 2-methyl-1,3-propanediol, 2,2,4-trimethylpentanediol, dipropylene glycol, polypropylene glycols, dibutylene glycol, polybutylene glycols, bisphenol A and tetrabromobisphenol A, or mixtures of said diols. In some cases, the diol component receives 40% to 100% by weight of hexanediol, such as hexane-1,6-diol, and/or hexanediol derivatives, such as those which in addition to terminal OH groups contain ether groups or ester groups, examples being products obtained by reacting 1 mol of hexanediol with at least 1 mol, such as 1 to 2 mol, of caprolactone in accordance with DE-A 1 770 245, or by etherifying hexanediol with itself to give the di- or trihexylene glycol. The preparation of such derivatives is known for example from DE-A 1 570 540. The polyether-polycarbonate diols described in DE-A 3 717 060 can also be used.

In some embodiments, the hydroxypolycarbonates are substantially linear. Incorporation of polyfunctional components, such as polyols of low molecular weight, however, can provide branching. Examples of compounds suitable for this purpose include trimethylolpropane, hexane-1,2,6-triol, glycerol, butane-1,2,4-triol, pentaerythritol, quinitol, mannitol, sorbitol, methyl glycoside and 4,3,6-dianhydrohexitols.

Additionally it is possible to incorporate groups having a hydrophilicizing action, particularly if use from an aqueous medium is envisaged, such as in an aqueous coating material, for example. Groups with a hydrophilicizing action are ionic groups, which may be either cationic or anionic in nature, and/or nonionic hydrophilic groups. Cationically, anionically or nonionically dispersing compounds are those which contain, for example, sulphonium, ammonium, phosphonium, carboxylate, sulphonate or phosphonate groups or the groups which can be converted into the aforementioned groups by forming salts (potentially ionic groups) or which contain polyether groups and can be incorporated by means of existing isocyanate-reactive groups, such as hydroxyl and amino groups.

Examples of suitable compounds containing ionic or potentially ionic groups are mono- and dihydroxycarboxylic acids, mono- and diaminocarboxylic acids, mono- and dihydroxysuilphonic acids, mono- and diaminosulphonic acids and also mono- and dihydroxyphosphonic acids or mono- and diaminophosphonic acids and their salts, such as dimethylol propionic acid, dimethylolbutyric acid, hydroxypivalic acid, N-(2-aminoethyl)-β-alanine, 2-(2-aminoethylamino)ethane-sulphonic acid, ethylenediamine-propyl- or butylsulphonic acid, 1,2- or 1,3-propylenediamine-β-ethylsulphonic acid, malic acid, citric acid, glycolic acid, lactic acid, glycine, alanine, taurine, lysine, 3,5-diaminobenzoic acid, an adduct of IPDI and acrylic acid (EP-A 0 916 647, Example 1) and its alkali metal and/or ammonium salts; the adduct of sodium bisulphite with but-2-ene-1,4-diol, polyethersulphonate, the propoxylated adduct of 2-butenediol and NaHSO$_3$, described for example in DE-A 2 446 440 (page 5-9, formula I-III) and also structural units which can be converted into cationic groups, such as N-methyldiethanolamine, as hydrophilic synthesis components. In some embodiments, the ionic or potential ionic compounds possess carboxyl or carboxylate and/or sulphonate groups and/or ammonium groups, including, for example, ionic compounds containing carboxyl and/or sulphonate groups as ionic or potentially ionic groups, such as the salts of N-(2-aminoethyl)-β-alanine, of 2-(2-aminoethylamino) ethanesulphonic acid or of the adduct of IPDI and acrylic acid (EP-A-0 916 647, Example 1) and also of dimethylolpropionic acid.

Suitable nonionically hydrophilicizing compounds are, for example, polyoxyalkylene ethers containing at least one hydroxyl or amino group. These polyethers include a fraction of from 30% to 100% by weight of units derived from ethylene oxide. Suitable compounds include polyethers of linear construction with a functionality of between 1 and 3, but also compounds of the following general Formula (I):

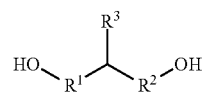

(1)

in which R$^1$ and R$^2$ independently of one another are each a divalent aliphatic, cycloaliphatic or aromatic radical having 1 to 18 carbon atoms, which may be interrupted by oxygen and/or nitrogen atoms, and R$^3$ is an alkoxy-terminated polyethylene oxide radical.

Nonionically hydrophilicizing compounds are, for example, also monohydric polyalkylene oxide polyether alcohols containing on average 5 to 70, such as 7 to 55, ethylene oxide units per molecule, such as are obtainable by alkoxylating suitable starter molecules (e.g. in Ullmanns Encyclopadie der technischen Chemie, 4th edition, volume 19, Verlag Chemie, Weinheim pp. 31-38), such as saturated monoalcohols such as methanol, ethanol, n-propanol, isopropanol, n-butanol, isobutanol, sec-butanol, the isomers pentanols, hexanols, octanols and nonanols, n-decanol, n-dodecanol, n-tetradecanol, n-hexadecanol, n-octadecanol, cyclohexanol, the isomeric methylcyclohexanols or hydroxylmethylcyclohexane, 3-ethyl-3-hydroxymethyloxetane or tetrahydrofurfuryl alcohol, diethylene glycol monoalkyl ethers such as, for example, diethylene glycol monobutyl ether, unsaturated alcohols such as allyl alcohol, 1,1-dimethylallyl alcohol or oleyl alcohol, aromatic alcohols such as phenol, the isomeric cresols or methoxyphenols, araliphatic alcohols such as benzyl alcohol, anisyl alcohol or cinnamyl alcohol, secondary monoamines such as dimethylamine, diethylamine, dipropylamine, diisopropylamine, dibutylamine, bis(2-ethylhexyl)amine, N-methyl- and N-ethylcyclohexylamine or dicyclohexylamine and also heterocyclic secondary amines such as morpholine, pyrrolidine, piperidine or 1H-pyrazole.

Alkylene oxides suitable for the alkoxylation reaction are, for example, ethylene oxide and propylene oxide, which can be used in any order or in a mixture.

The polyalkylene oxide polyether alcohols are either straight polyethylene oxide polyethers or mixed polyalkylene oxide polyethers at least 30 mol %, such as at least 40 mol %, of whose alkylene oxide units are composed of ethylene oxide units.

Suitable compounds of the catalyst component (D) include urethanization catalysts, such as organotin compounds or aminic catalysts. Suitable organotin compounds include dibutyltin diacetate, dibutyltin dilaurate, dibutyltin bis-acetoacetonate and tin carboxylates such as tin octoate, for example. The tin catalyst(s) may be used in combination with aminic catalysts, such as aminosilanes or 1,4-diazabicyclo[2.2.2]octane.

The catalyst (D), if used at all, is often employed in amounts of 0.001% to 5.0%, such as 0.001% to 0.1%, or, in some cases, 0.005%-to 0.05% by weight, based on solids content of the process product.

Suitable for use as (E) are allophanatization catalysts, such as zinc salts, including zinc octoate, zinc acetylacetonate and zinc 2-ethylcaproate, or tetraalkylammonium compounds, such as N,N,N-trimethyl-N-2-hydroxypropylammonium hydroxide, N,N,N-trimethyl-N-2-hydroxypropylammonium 2-ethylhexanoate or choline 2-eihylhexanoate.

The allophanatization catalyst is often used in amounts of 0.001-5.0% by weight, such as 0.01-1.0% by weight, or, in some cases, 0.05-0.5% by weight, based on solids content of the process product.

In principle it is possible to use the allophanatization catalyst (E) even for the urethanization reaction in (D) and to simplify the two-stage procedure into a one-stage reaction. The catalyst (E) can be added in a portion all at once or else in a number of portions or else continuously. In some embodiments, the catalyst (E) is added at a rate of 200-600 ppm/h and in order to complete the allophanatization the reaction mixture is stirred on until the desired NCO content of the end product is reached.

In certain embodiments, the allophanatization reaction is carried out until the NCO content of the product is below 0.5% by weight, such as below 0.3% by weight.

It is possible in principle to react a residual NCO group content with NCO-reactive compounds such as alcohols, for example, after the end of the allophanatization reaction. This can give products having low NCO contents.

It is also possible to apply the catalysts (D) and/or (E) to support materials by methods known to the skilled person and to use them as heterogeneous catalysts.

It is possible to make use at any desired point in the production of the allophonate unsaturated urethane (meth) acrylate of solvents or reactive diluents. Suitable solvents are inert towards the functional groups present in the process product from the time of their addition up to the end of the process and are, for example, hydrocarbons, ketones and esters, e.g. toluene, xylene, isooctane, acetone, butanone, methyl isobutyl ketone, ethyl acetate, butyl acetate, tetrahydrofuran, N-methyl-pyrrolidone, dimethylacetamide and dimethylformamide, though, in some cases, no solvent is added.

As reactive diluents it is possible to use compounds which in the course of UV curing are likewise (co)polymerized and hence incorporated into the polymer network and are inert towards NCO groups. Such reactive diluents are described exemplarily, by way of example, in P. K. T. Oldring (Ed.), Chemistry & Technology of UV & EB Formulations For Coatings, Inks & Paints, Vol. 2, 1991, SITA Technology, London, pp. 237-285. They may be esters of acrylic acid or methacrylic acid with mono- or polyfunctional alcohols. Examples of suitable alcohols include the isomeric butanols, pentanols, hexanols, heptanols, octanols, nonanols and decanols, and also cycloaliphatic alcohols such as isobornol, cyclohexanol and alkylated cyclohexanols, dicyclo-pentanol, arylaliphatic alcohols such as phenoxyethanol and nonylphenylethanol, and tetrahydrofurfuryl alcohols. Additionally it is possible to use alkoxylated derivatives of these alcohols. Suitable dihydric alcohols are, for example, alcohols such as ethylene glycol, propane-1,2-diol, propane-1, 3-diol, diethylene glycol, dipropylene glycol, the isomeric butanediols, neopentyl glycol, hexane-1,6-diol, 2-ethylhexanediol and tripropylene glycol or else alkoxylated derivatives of these alcohols. Suitable dihydric alcohols are hexane-1,6-diol, dipropylene glycol and tripropylene glycol. Suitable trihydric alcohols are glycerol or trimethylolpropane or their alkoxylated derivatives. Tetrahydric alcohols are pentaerythritol or its alkoxylated derivatives.

In certain embodiments, as a constituent of component (A) or (B), before and/or during the reaction, stabilizers are added to inhibit polymerization, such as phenothiazine. Possible other stabilizers are phenols, such as para-methoxyphenyl, 2,5-di-tert-butylhydroquinone or 2,6-di-tert-butyl-4-methylphenol. Also suitable are N-oxyl compounds, such as 2,2,6,6-tetramethylpiperidine N-oxide (TEMPO) or its derivatives.

In order to stabilize the reaction mixture, in particular the unsaturated groups, against premature polymerization it is possible to pass an oxygen-containing gas, such as air, into and/or over the reaction mixture. The gas may have a very low moisture content, in order to prevent unwanted reaction in the presence of isocyanate.

The stabilizer component is used typically in amounts of 0.001% to 5.0% by weight, such as 0.01% to 2.0% by weight, or, in some cases, 0.05% to 1.0% by weight, based on the solids content of the process product.

In certain embodiments, the process is carried out at temperatures of not more than 100° C., such as 20 to 100° C., or, in some cases, 40 to 100° C. or 60 to 90° C.

The allophanate unsaturated urethane (meth)acrylate polymer, especially those based on the HDI, may, in some cases, have a shear viscosity at 23° C. of ≤150000 mPas, such as ≤80000 mPas. The allophanate unsaturated urethane (meth)acrylate polymer, especially those based on the HDI, may, in some cases, have a number-average molecular weight of 600 to 3000 g/mol, such as 650 to 1500 g/mol.

The allophanate unsaturated urethane (meth)acrylate polymer often contain less than 0.5% by weight of free di- and/or triisocyanate monomers, such as less than 0.3% by weight, or, in some cases, less than 0.1% by weight.

In certain embodiments, the foregoing allophonate unsaturated urethane (meth)acrylate polymer is present in the composition in an amount of up to 90 percent by weight, up to 80 percent by weight, or, in some cases, up to 70 percent by weight, and/or at least 10 percent by weight, at least 20 percent by weight, or, in some cases, at least 30 percent by weight, the foregoing weight percentages being based on the total weight of the composition.

In some embodiments of the present disclosure, in addition to or in lieu of the previously described urethane (meth)acrylate polymer and/or the foregoing allophanate unsaturated urethane (meth)acrylate polymer, the composition includes a lactone-containing (meth)acrylate. As used herein, "lactone-containing (meth)acrylate" refers to a (meth)acrylate that includes a lactone-derived moiety.

In some embodiments of the present disclosure, the composition includes a lactone-containing (meth)acrylate that is the reaction product of a composition including: (i) a di- and/or polyisocyanate and (ii) a hydroxy functional lactone ester (meth)acrylate with a number average molecular weight of from 200 to 2000 g/mol and having the following formula (II):

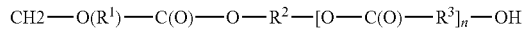

Formula (II)

CH2—O(R¹)—C(O)—O—R²—[O—C(O)—R³]$_n$—OH wherein n is an integer of from 1 to 5, $R^1$ is hydrogen or methyl, $R^2$ is an alkylene group or substituted alkylene group having from 2 to 10 carbon atoms and which may be substituted with one or more alkyl groups having from 1 to 12 carbon atoms, and $R^3$ is a straight or branched chain alkylene group of from 3 to 8 carbon atoms, and which may be substituted with one or more alkyl groups having from 1 to 12 carbon atoms. Such lactone-containing (meth)acrylates are described in U.S. Pat. No. 7,294,656 at col. 3, ln. 1 to col. 6, ln. 48, the cited portion of which being incorporated herein by reference.

In certain embodiments, the lactone-containing (meth)acrylate is present in the composition in an amount of up to 90 percent by weight, up to 80 percent by weight, or, in some cases, up to 70 percent by weight, and/or at least 10 percent by weight, at least 20 percent by weight, or, in some cases, at least 30 percent by weight, the foregoing weight percentages being based on the total weight of the composition.

As indicated, in certain embodiments, the lactone-containing (meth)acrylate is a reaction product of a composition including: (i) a di- and/or polyisocyanate and (ii) a hydroxy functional lactone ester (meth)acrylate. Suitable polyisocyanates include substantially any organic di- and/or polyisocyanate. Aromatic, araliphatic, aliphatic or cycloaliphatic di- and/or polyisocyanates and mixtures of such isocyanates may be used. In some cases, the diisocyanate is of the formula $R^4(NCO)_2$, wherein $R^4$ represents an aliphatic hydrocarbon residue having 4 to 12 carbon atoms, a cycloaliphatic hydrocarbon residue having 6 to 15 carbon atoms, an aromatic hydrocarbon residue having 6 to 15 carbon atoms or an araliphatic hydrocarbon residue having 7 to 15 carbon atoms. Specific examples of suitable isocyanates include, but are not limited to, xylylene diisocyanate, tetramethylene diisocyanate, 1,4-diisocyantobutane, 1,12-diisocyanatododecane, hexamethylene diisocyanate, 2,3,3-trimethylhexamethylene diisocyanate, 1,4-cyclohexylene diisocyanate, 4,4'-dicyclohexylmethane diisocyanate, 4,4'-dicyclohexyl diisocyanate, 1-diisocyanato-3,3,5-trimethyl-5-isocyanatomethylcyclohexane (isophorone diisocyanate), 1,4-phenylene diisocyanate, 2,6-tolylene diisocyanate, 2,4-tolylene diisocyanate, 1,5-naphthylene diisocyanate, 2,4'- or 4,4'-diphenylmethane diisocyanate, 4,4'-diphenyldimethylmethane diisocyanate, α, α, α', α'-tetramethyl-m- or p-xylylene diisocyanate, and triphenylmethane 4,4',4''-triisocyanate as well as mixtures thereof.

Polyisocyanates having isocyanurate, biuret, allophanate, uretidione or carbodiimide groups are also useful as the isocyanate component. Such polyisocyanates may have isocyanate functionalities of 3 or more. Such isocyanates are prepared by the trimerization or oligomerization of diisocyanates or by the reaction of diisocyanates with polyfunctional compounds containing hydroxyl or amine groups. In certain embodiments of the present disclosure, the polyisocyanate has allophonate groups and is prepared by the reaction of a diisocyanate with a polyfunctional compound containing hydroxyl or amine groups, such as any of the —OH functional compounds having a number average molecular weight of from 600 to 4000 g/mol described earlier.

Suitable hydroxy functional lactone ester (meth)acrylates (hereinafter "lactone-acrylate adducts") can be prepared by reacting an appropriate lactone with an acrylate or methacrylate acid ester. Lactones employed in the preparation of the lactone-acrylate adducts often have the following formula (III):

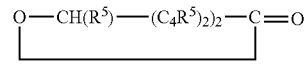

Formula (III)

O—CH(R⁵)—(C₄R⁵)₂)₂—C=O wherein $R^5$ is hydrogen or an alkyl group having from 1 to 12 carbon atoms, z is from 2 to 7, such as wherein z is 4 and at least 6 of the $R^5$'s are hydrogen with the remainder, if any, being alkyl groups. In some cases, none of the substituents contain more than 12 carbon atoms and the total number of carbon atoms in these substituents on the lactone ring does not exceed 12. Unsubstituted ε-caprolactone, i.e., where each $R^5$ is hydrogen, is a derivative of 6-hydroxyhexanoic acid. Both the unsubstituted and substituted ε-caprolactones are available by reacting the corresponding cyclohexanone with an oxidizing agent such as peracetic acid.

Substituted ε-caprolactones suitable for preparing the lactone-acrylate adducts include ε-monoalkylcapro-lactones wherein the alkyl groups contain from 1 to 12 carbon atoms, e.g., ε-methyl-caprolactone, ε-ethyl-caprolactone, ε-propyl-caprolactone and/or ε-dodecyl-caprolactone. Useful also are ε-dialkylcaprolactones in which the alkyl groups are substituted on the same or different carbon atoms, but not both on the omega carbon atoms. Also useful are the ε-trialkylcaprolactones wherein 2 or 3 carbon atoms in the lactone ring are substituted provided, though, that the omega carbon atom is not di-substituted. In some cases, the lactone is the ε-caprolactone wherein z in the above formula is 4 and each $R^5$ is hydrogen.

The acrylate or methacrylate acid esters utilized to prepare the lactone-acrylate adducts often contain from 1 to 3 acrylyl or α-substituted acrylyl groups and one or two hydroxyl groups. Such esters are commercially available or can be readily synthesized. Commercially available esters include the hydroxyalkyl acrylates or hydroxyalkyl methacrylates wherein the alkyl group contains from 2 to 10 carbon atoms, such as from 2 to 6 carbon atoms. The hydroxyalkyl acrylates and methacrylates have the following formula (IV):

$$CH_2\!=\!CR^1\!-\!C(O))\!-\!R^2\!-\!OH \qquad \text{Formula (IV)}$$

wherein $R^1$ is hydrogen or methyl and $R^2$ is a linear or a branched alkylene group having from 2 to 10 carbon atoms, such as from 2 to 6 carbon atoms.

Examples of suitable hydroxyalkyl (meth)acrylates include 2-hydroxyethyl acrylate, 2-hydroxypropyl acrylate, 3-hydroxypropyl acrylate, 2-hydroxybutyl acrylate, 4-hydroxybutyl acrylate, 3-hydroxypentyl acrylate, 6-hydroxynonyl acrylate, 2-hydroxyethyl methacrylate, 2-hydroxypropyl methacrylate, 3-hydroxypropyl methacrylate, 2-hydroxybutyl methacrylate, 2-hydroxypentyl methacrylate, 5-hydroxypentyl methacrylate, 7-hydroxyheptyl methacrylate and 5-hydroxydecyl methacrylate.

In some cases, the lactone-acrylate adducts have the following formula (V):

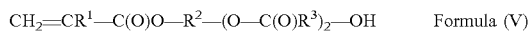

$$CH_2\!=\!CR^1\!-\!C(O)O\!-\!R^2\!-\!(O\!-\!C(O)R^3)_2\!-\!OH \qquad \text{Formula (V)}$$

wherein $R^1$, $R^2$, and $R^3$ are as described above.

The lactone-acrylate adduct may be prepared by reacting the lactone with the hydroxyalkyl acrylate in the presence of less than 200 parts per million of a catalyst. The catalysts which may be used include one or more organometallic compounds and other metallic compounds such as stannic chloride or ferric chloride and other Lewis or protonic acids. The reaction can be carried out at a temperature of from 100° C. to 400° C., such as from 120° C. to 130° C. The reaction may be carried out at atmospheric pressure, although higher or lower pressures may be used. The reaction is generally carried out in the presence of oxygen to inhibit polymerization of the hydroxyalkyl acrylate. The reaction is generally carried out for a period of from 2 to 20 hours. The reaction may be carried out in the presence of a suitable inhibitor to prevent polymerization of the hydroxyalkyl acrylate double bond. These inhibitors include the monomethyl ether of hydroquinone, benzoquinone, phenothiazine, methyl hydroquinone, 2,5-di-t-butylquinone, hydroquinone, benzoquinone and other common free radical inhibitors known in the art. The level of inhibitor used is often less than 1000 parts per million, such as less than 800 parts per million, and, in some cases, less than 600 parts per million. The molar ratio of the lactone to hydroxyl groups in the ester is from 1:0.1 to 1:5, such as from 1:0.3 to 1:3.

One example of a lactone-acrylate adduct that may be used is a caprolactone-2-hydroxyethyl acrylate adduct available as TONE M-100, which has the following formula (VI):

Formula (VI)

$$CH_2\!=\!CH\!-\!C(O)O\!-\!CH_2\!-\!CH_2\!-\!(O\!-\!C(O)(CH_2)_5)_2\!-\!OH,$$

While some embodiments of the disclosure contain two molecules of lactone, on the average, per (meth)acrylate group, useful products can have from one to five lactone units per (meth)acrylate group, or can be a mixture of compounds that contain from one to five lactone units. In addition to caprolactone, the lactone units could be derived from other lactones such as beta-propiolactone, delta-valerolactone, delta-butyrolactone, zeta-enantholactone, and eta-caprylolactone, or substituted lactones such as 6-methyl-epsilon-caprolactone, 3-methyl-epsilon-caprolactone, 5-methyl-epsilon-caprolactone, 4-methyl-delta-valerolactone, and 3,5-dimethyl-epsilon caprolactone.

For reaction with the isocyanate, the lactone-acrylate adduct is often heated to a temperature of from 40 to 100° C., such as 60° C. At this time, a catalytic amount of a urethane catalyst, e.g., dibutyl tin dilaurate, is added followed by addition of the isocyanate at a rate which maintains the desired reaction temperature. The amount of the isocyanate will be essentially equal (e.g., 1.01:1 to 1:1.01), on an equivalents basis, to the hydroxyl equivalents of the lactone-acrylate adduct.

When the addition is complete, the reaction is typically heated, e.g., to a temperature of 80° C. to 100° C., and held for from 2 to 4 hours or until the NCO content is <0.5% by weight as measured for example by titration with dibutyl amine. Thereafter, the product may be cooled prior to storage.

Further details as to the production of the lactone esters and/or the reaction products of the lactone esters with isocyanates can be found in U.S. Pat. Nos. 4,188,472, 4,340,497, 4,429,082, 4,504,635, 4,683,287, 6,465,539 and 6,534,128, WO 97/04881, WO 03/027162, and German Offenlegungsschrift 2,914,982, incorporated by reference herein.

In certain embodiments, the composition includes (a) up to 70 percent by weight, such as up to 60 percent by weight, or, in some cases, up to 50 percent by weight, based on the total weight of (a) and (b), of an unsaturated (meth)acrylate polymer or oligomer which is the reaction product of a composition including: (i) an organic polyisocyanate, (ii) a polyol having a number average molecular weight of from 600 to 4000 g/mole, and (iii) at least one of: (1) a hydroxyl-functional (meth)acrylate, (2) an unsaturated (meth)acrylate polyol based on a polyester, a polyether, a polythioether, a polyacetal, a polycarbonate, a dimer fatty alcohol and/or an esteramide, in each case with a number average molecular weight of 400 to 8000 g/mole, the composition including an isocyanate to hydroxyl equivalent ratio of from 0.5:1 to 1:0.5, such as 0.9:1 to 1:0.9; (b) at least 30 percent by weight, such as at least 40 percent by weight, or, in some cases, at least 50 percent by weight, based on the total weight of the sum of (a) and (b), of at least one of: (i) any of the previously described an allophanate unsaturated urethane (meth)acrylates, different from component (a); and (ii) any of the previously described lactone-containing (meth) acrylates.

Photoinitiators

The compositions of the present disclosure preferably may also include a photoinitiator. A variety of photoinitiators can be utilized. The usual photoinitiators are the type that generate free radicals when exposed to radiation energy. Illustrative of suitable photoinitiators include 2,2-diethoxy-acetophenone; 2- or 3- or 4-bromoacetophenone; 3- or 4-allyl-acetophenone; 2-acetonaphthone; benzaldehyde; benzoin; the alkyl benzoin ethers; benzophenone; benzoquinone; 1-chloroanthraquinone; p-diacetyl-benzene; 9,10-dibromoanthracene; 9,10-dichloroanthracene; 4,4-dichlorobenzophenone; thioxanthone; isopropylthioxanthone; methylthioxanthone; α, α, α-trichloro-para-t-butyl acetophenone; 4-methoxybenzophenone; 3-chloro-8-nonylxanthone; 3-iodo-7-methoxyxanthone; carbazole; 4-chloro-4'-benzylbenzophenone; fluoroene; fluoroenone; 1,4-naphthylphenylketone; 1,3-pentanedione; 2,2-di-sec.-butoxy acetophenone; dimethoxyphenyl acetophenone;

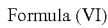

propiophenone; isopropylthioxanthone; chlorothioxanthone; xanthone; and mixtures thereof. There are several suitable photoinitiators commercially available from IGM Resins including Irgacure® 184 (1-hydroxy-cyclohexyl-phenyl-ketone); Irgacure® 819 (bis(2,4,6-trimethylbenzoyl)-phenylphosphineoxide); Irgacure® 1850 (a 50/50 mixture of bis(2,6-dimethoxybenzoyl)-2,4,4-trimethylpentyl-phosphine oxide and 1-hydroxy-cyclohexyl-phenyl-ketone); Irgacure® 1700 (a 25/75 mixture of bis(2,6-dimethoxybenzoyl)-2,4,4-trimethylpentyl-phosphine oxide and 2-hydroxy-2-methyl-1-phenyl-propan-1-one); Irgacure® 907 (2-methyl-1[4-(methylthio)phenyl]-2-morpholonopropan-1-one); Darocur® MBF (a pheny glyoxylic acid methyl ester) and Darocur° 4265 (a 50/50 mixture of bis(2,4,6-trimethylbenzoyl)-phenylphosphine-oxide, Irgacure® 2022 (a mixture of Irgacure® 819 (phosphine oxide, phenyl bis(2,4,6-trimethyl benzoyl)) (20 wt %), and Darocure® 1173 (2-hydroxy-2-methyl-1-phenyl-1-propanone) (80 wt %)) and 2-hydroxy-2-methyl-1-phenyl-propan-1-one). The foregoing lists are meant to be illustrative only and are not meant to exclude any suitable photoinitiators known to those skilled in the art. Those skilled in the art will know the concentrations at which photoinitiators are effectively employed and generally the concentration will not exceed 10% by weight of the radiation-curable coating composition.

A variety of photoinitiators can be utilized in the radiation-curing compositions of the present disclosure. The usual photoinitiators are the type that generate free radicals when exposed to radiation energy. Illustrative of suitable photoinitiators include 2,2-diethoxyacetophenone; 2- or 3- or 4-bromoacetophenone; 3- or 4-allyl-acetophenone; 2-acetonaphthone; benzaldehyde; benzoin; the alkyl benzoin ethers; benzophenone; benzoquinone; 1-chloroan thraquinone; p-diacetyl-benzene; 9,10-dibromoanthracene; 9,10-dichloroanthracene; 4,4-dichlorobenzophenone; thioxanthone; isopropyl-thioxanthone; methylthioxanthone; a,a,a-trichloro-para-t-butyl acetophenone; 4-methoxyben-zophenone; 3-chloro-8-nonylxanthone; 3-iodo-7-methoxyxanthone; carbazole; 4-chloro-4'-benzylbenzophenone; fluoroene; fluoroenone; 1,4-naphthylphenylketone; 1,3-pentanedione; 2,2-di-sec.-butoxy acetophenone; dimethoxyphenyl acetophenone; propiophe none; isopropylthioxanthone; chlorothioxanthone; xanthone; and mixtures thereof. There are several suitable photoinitia tors commercially available from IGM Resins including Irgacure® 184 (1-hydroxy-cyclohexyl-phenyl-ketone); Irgacure® 819 (bis (2,4, 6-trimethylbenzoyl)-phenylphosphineoxide); Irga cure® 1850 (a 50/50 mixture of bis(2,6-dimethoxybenzoyl)-2,4,4-trimethylpentyl-phosphine oxide and 1-hydroxy-cy clohexyl-phenyl-ketone); Irgacure® 1700 (a 25/75 mixture of bis(2,6-dimethoxybenzoyl)-2,4,4-trimethylpentyl-phosphine oxide and 2-hydroxy-2-methyl-1-phenyl-propan-1-one); Irgacure® 907 (2-methyl-1 [4-(methylthio)phenyl]-2-morpholonopropan-1-one); Darocur® MBF (a pheny glyoxylic acid methyl ester) and Darocur® 4265 (a 50/50 mixture of bis(2,4,6-trimethylbenzoyl)-phenylphosphine oxide, Irgacure® 2022 (a mixture of Irgacure® 819 (phosphine oxide, phenyl bis(2,4,6-trimethyl benzoyl)) (20 wt %), and Darocure® 1173 (2-hydroxy-2-methyl-1-phenyl-1-propanone) (80 wt %)) and 2-hydroxy-2-methyl-1-phenyl-pro pan-1-one). The foregoing lists are meant to be illustrative only and are not meant to exclude any suitable photoinitiators known to those skilled in the art. Those skilled in the art will know the concentrations at which photoinitiators are effectively employed and generally the concentration will not exceed about 10% by weight of the radiation-curable coating composition.

Those skilled in the art of photochemistry are fully aware that photoactivators can be used in combination with the aforementioned photoinitiators and that synergistic effects are sometimes achieved when such combinations are used. Photoactivators are well known in the art and require no further description to make known what they are and the concentrations at which they are effective. Nonetheless, one can mention as illustrative of suitable photoactivators, methy lamine, tributylamine, methyldiethanolamine, 2-aminoethyl ethanolamine, cyclohexylamine, cyclopentadienylamine, diphenylamine, ditolylamine, trixylylamine, tribenzylamine, n-cyclohexylethyleneimine, piperidine, N-methylpiperazine, 2,2-dimethyl-1,3-bis(3-N-morpholinyl)-propionyloxy-propane, and mixtures thereof.

Acrylate Monomer

In addition to components 1) and 2), the coating compositions according to the disclosure may also contain copolymerizable monomers, which also serve the function as a reactive diluent. The copolymerizable monomers are selected from organic compounds which contain at least one copolymerizable olefinic double bond, preferably 2 or more double bonds, and preferably have a viscosity of not more than 1000, more preferably not more than 500 mPa·s at 23° C., such as di- and polyacrylates and di- and polymethacrylates of glycols having 2 to 6 carbon atoms and polyols having 3 to 4 hydroxyl groups and 3 to 6 carbon atoms.

Examples include ethylene glycol diacrylate, pro pane 1,3-diol diacrylate, butane 1,4-diol diacrylate, hexane 1,6-diol diacrylate, trimethylolpropane triacrylate, pen taerythritol tri- and tetraacrylate, and the corresponding methacrylates. Also suitable are di(meth)acrylates of poly ether glycols of initiated with ethylene glycol, propane 1,3-diol, butane 1,4-diol; triacrylates of the reaction products of 1 mole of trimethylolpropane with 2.5 to 5 moles of ethylene oxide and/or propylene oxide; and tri- and tetraacrylates of the reaction products of 1 mole of pentaerythritol with 3 to 6 moles of ethylene oxide and/or propylene oxide. Other copolymerizable monomers include aromatic vinyl compounds such as styrene; vinyl alkyl ethers such as vinylbutyl ether or triethylene glycol divinyl ether; and allyl compounds such as triallylisocyanurate. Preferably, the copolymerizable monomers have functionalities of two or more.

The copolymerizable monomers may be present in amounts of up to 500% by weight, preferably up to 200% by weight and more preferably up to 50% by weight, based on the weight of components 1) and 2).

Additives

The coating compositions may further include known additives. Examples of these additives include adhesion promoters, wetting agents, flow control agents, antiskinning agents, antifoaming agents, matting agents, (such as silica, aluminum silicates and high-boiling waxes), viscosity regulators, pigments (including both organic and inorganic pigments), dyes, UV absorbers and stabilizers against thermal and oxidative degradation.

Formulation Procedures

EXAMPLES

Materials used in the Examples: "4683"—EBECRYL® 4683 (Unsaturated aliphatic urethane acrylate, Allnex USA Inc., Alpharetta, Ga. "4740"—EBECRYL® 4740 (Unsaturated aliphatic allophanate urethane acrylate, Allnex USA Inc., Alpharetta, Ga.); "4738" EBECRYL® 4738 (Unsaturated aliphatic allophanate urethane acrylate, Allnex USA Inc. , Alpharetta, Ga.) "4513"—EBECRYL.® 4513 (Unsaturated aliphatic urethane acrylate based on a hydroxyl functional lactone ester (meth)acrylate, Allnex USA Inc., Alpharetta, Ga.; IBOA (SR-506) (isobornyl acrylate, Sartomer USA, LLC);TBCH (4-tert-butyl cyclohexyl acrylate; BASF Corporation), Disperbyk 111 (wetting and dispersing copolymer with acidic groups; BYK USA Inc.);R960 TiO2 (Rutile titanium dioxide; The Chemours Co. TT, LLC); Bayferrox 318 M ("2022"—Omnirad. 2022 (photoinitiator available from IGM Resins.); "819"—Omnirad® 819 (photoinitiator available from IGM Resins.); "784"—Omnirad® 784 (photoinitiator available from IGM Resins.); "VLT"— Speedcure VLT (photoinitiator available from Lambson Ltd.,); "3320"—Poly-Fox PF® 3320 (Fluorinated oxetane oligomer, OMNOVA SOLUTIONS); "5161"—Genomer 5161 (acrylated amine synergist; Rahn USA Corp.); Doublecure® 1256 (photoinitiator; Double Bond Chemical Ind., Co., Ltd.); "4002" Sartomer® CN 4002 (florinated acrylate oligomer; Sartomer Americas); "8110"—EBECRYL® 8110 (fluorinated urethane acrylate oligomer; Allnex USA Inc.); "7298"—Fluoracryl® 7298 (perfluoropolyether; Cytonix, LLC); "13906" Sartomer® NTX 13906 (fluorinated urethane acrylate oligomer; Sartomer Americas)

Formulation A Pigmented

Utilizing a Premier Mill Corp. Laboratory Dispersator Series #2000 #50 the following formulation 'A' as shown in Table 1 was manufactured:

A resin solution was made by taking 10.49 parts by weight of Ebecryl 4740 with 10.00 parts of Isobornyl Acrylate (IBOA), and 2.91 parts of Disperbyk 111 and were mixed until the resin solution became homogenous. After this resin solution became homogenous, 11.03 parts of R960 TiO$_2$ (Titanium Dioxide) was added to the resin solution and dispersed until a 6+ grind value was measured on a Hegman grind gauge. To this pigmented resin solution, 5.83 parts of Bayferrox 318 NM was now added and the total solution was now dispersed until a 6+ grind value was measured on a Hegman grind gauge. 11.41 parts of Isobornyl Acrylate (IBOA) was added to keep the viscosity from getting to high as the grinds were being achieved for the TiO2 and Bayferrox 318 NM. Once both grinds were achieved, 25.61 parts of Ebecryl 4683, 5.08 parts of Ebecryl 4513, 0.08 parts of Byk 306, 2.06 parts of Miwon SC1400, and 2.06 parts of Trimethylolpropane Ethoxy Triacrylate(TMPEOTA), were now added to the above pigmented resin solution until the pigmented resin solution became homogeneous. After this pigmented resin solution became homogeneous, 9.91 parts of Syloid Rad 2005 was added to the above pigmented resin solution and dispersed until a 6+ grind value was measured on a Hegman grind gauge. Once the Syloid Rad 2005 grind was achieved, 1.83 parts of Dalian 184 was now added to the above pigmented resin solution and dispersed until the Dalian 184 was completely dissolved. Once the Dalian 184 was completely dissolved, 1.08 parts of Omnirad 2022 and 0.62 parts of Chigard 101 were now added to the above pigmented resin solution and then fully dispersed. A small portion of the formulation was then de-aerated under vacuum in a desiccator to measure viscosity and weight per gallon. The remainder of the formulation was de-aerated overnight.

This resin solution resulted in a weight per gallon of 10.67 lbs/gal and a viscosity of 16,320 at 5 RPM and 7,980 at 20 RPM both measured with a number 4 spindle on a Brookfield Synchro-Lectric Viscometer.

This coating is then cured into Microstructure Patterns per the description of WO2017063040A where by a 405 nm laser diode with a power output of up to 50 mW is used to cure structured riblets. The structured riblets can be of the following variety: sawtooth riblet geometry, scalloped riblet geometry, and a blade riblet geometry. A so-called bottom up curing is developed using the technique described in WO2017063040A.

Formulation B Clear

Utilizing a Stir-Pak Dual Shaft Mixer Model #SSM20 the following formulation 'B' as shown in Table 1 was manufactured:

A resin solution was made by taking 14.92 parts by weight of Ebecryl 4740 with 30.45 parts of Isobornyl Acrylate (IBOA), 36.42 parts of Ebecryl 4683, 7.22 parts of Ebecryl 4513, 0.11 parts of Byk 306, 2.93 parts of Miwon SC1400, 2.93 parts of Trimethylolpropane Ethoxy Triacrylate (TMPEOTA), and were mixed until the resin solution became homogenous. After this resin solution became homogenous, 2.60 parts of Dalian 184 was then added under high sheer mixing. After the Dalian 184 was completely dissolved 1.54 parts of Omnirad 2022 and 0.88 parts of Chigard 101 were now added to the resin solution. This solution was then mixed until it became homogenous. A small portion of the formulation was then de-aerated under vacuum in a desiccator to measure viscosity and weight per gallon. The remainder of the formulation was de-aerated overnight.

This resin solution resulted in a weight per gallon of 8.94 lbs/gal and a viscosity of 768 at 5 RPM and 799 at 50 RPM both measured with a number 3 spindle on a Brookfield Synchro-Lectric Viscometer.

This coating is then cured into Microstructure Patterns per the description of WO2017063040A where by a 405 nm laser diode with a power output of up to 50 mW is used to cure structured riblets. The structured riblets can be of the following variety: sawtooth riblet geometry, scalloped riblet geometry, and a blade riblet geometry. A so-called bottom up curing is developed using the technique described in WO2017063040A.

Formulation C Pigmented

Utilizing a Premier Mill Corp. Laboratory Dispersator Series #2000 #50 the following formulation 'C' as shown in Table 1 was manufactured:

A resin solution was made by taking 10.19 parts by weight of Ebecryl 4740 with 9.72 parts of Isobornyl Acrylate (IBOA), and 2.83 parts of Disperbyk 111 and were mixed until the resin solution became homogenous. After this resin solution became homogenous, 10.72 parts of R960 TiO$_2$ (Titanium Dioxide) was added to the resin solution and dispersed until a 6+ grind value was measured on a Hegman grind gauge. To this pigmented resin solution, 5.67 parts of Bayferrox 318 NM was now added and the total solution was now dispersed until a 6+ grind value was measured on a Hegman grind gauge. 11.09 parts of Isobornyl Acrylate (IBOA) was added to keep the viscosity from getting to high as the grinds were being achieved for the TiO2 and Bayferrox 318 NM. Once both grinds were achieved, 24.89 parts of Ebecryl 4683, 4.94 parts of Ebecryl 4513, 0.08 parts of Byk 306, 2.00 parts of Miwon SC1400, and 2.00 parts of Trimethylolpropane Ethoxy Triacrylate(TMPEOTA), were now added to the above pigmented resin solution until the pigmented resin solution became homogeneous. After this pigmented resin solution became homogeneous, 9.61 parts of Syloid Rad 2005 was added to the above pigmented resin solution and dispersed until a 6+ grind value was measured on a Hegman grind gauge. Once the Syloid Rad 2005 grind was achieved, 3.56 parts of Dalian 184 was now added to the above pigmented resin solution and dispersed until the Dalian 184 was completely dissolved. Once the Dalian 184 was completely dissolved, 2.10 parts of Omnirad 2022 and 0.60 parts of Chigard 101 were now added to the above pigmented resin solution and then fully dispersed. A small portion of the formulation was then de-aerated under vacuum in a desiccator to measure viscosity and weight per gallon. The remainder of the formulation was de-aerated overnight.

This resin solution resulted in a weight per gallon of 10.62 lbs.gal and a viscosity of 18,480 at 5 RPM and 8,700 at 20 RPM both measured with a number 4 spindle on a Brookfield Synchro-Lectric Viscometer.

This coating is then cured into Microstructure Patterns per the description of WO2017063040A where by a 405 nm laser diode with a power output of up to 50 mW is used to cure structured riblets. The structured riblets can be of the following variety: sawtooth riblet geometry, scalloped riblet geometry, and a blade riblet geometry. A so-called bottom up curing is developed using the technique described in WO2017063040A.

Formulation D Pigmented High Gloss

Utilizing a Premier Mill Corp. Laboratory Dispersator Series #2000 #50 the following formulation 'D' as shown in Table 1 was manufactured:

A resin solution was made by taking 11.64 parts by weight of Ebecryl 4740 with 11.10 parts of Isobornyl Acrylate (IBOA), and 3.23 parts of Disperbyk 111 and were mixed until the resin solution became homogenous. After this resin solution became homogenous, 12.24 parts of R960 $TiO_2$ (Titanium Dioxide) was added to the resin solution and dispersed until a 6+ grind value was measured on a Hegman grind gauge. To this pigmented resin solution, 6.47 parts of Bayferrox 318 NM was now added and the total solution was now dispersed until a 6+ grind value was measured on a Hegman grind gauge. 12.64 parts of Isobornyl Acrylate (IBOA) was added to keep the viscosity from getting to high as the grinds were being achieved for the TiO2 and Bayferrox 318 NM. Once both grinds were achieved, 28.43 parts of Ebecryl 4683, 5.65 parts of Ebecryl 4513, 0.08 parts of Byk 306, 2.29 parts of Miwon SC1400, and 2.29 parts of Trimethylolpropane Ethoxy Triacrylate(TMPEOTA), were now added to the above pigmented resin solution until the pigmented resin solution became homogeneous. 2.03 parts of Dalian 184 was now added to the above pigmented resin solution and dispersed until the Dalian 184 was completely dissolved. Once the Dalian 184 was completely dissolved, 1.20 parts of Omnirad 2022 and 0.69 parts of Chigard 101 were now added to the above pigmented resin solution and then fully dispersed. A small portion of the formulation was then de-aerated under vacuum in a desiccator to measure viscosity and weight per gallon. The remainder of the formulation was de-aerated overnight.

This resin solution resulted in a weight per gallon of 10.39 lbs./gal and a viscosity of 3,120 at 5 RPM and 1,644 at 50 RPM both measured with a number 3 spindle on a Brookfield Synchro-Lectric Viscometer.

This coating is then cured into Microstructure Patterns per the description of WO2017063040A where by a 405 nm laser diode with a power output of up to 50 mW is used to cure structured riblets. The structured riblets can be of the following variety: sawtooth riblet geometry, scalloped riblet geometry, and a blade riblet geometry. A so-called bottom up curing is developed using the technique described in WO2017063040A.

Formulation E Clear High Gloss

Utilizing a Stir-Pak Dual Shaft Mixer Model #SSM20 the following formulation 'E' as shown in Table 1 was manufactured:

A resin solution was made by taking 14.92 parts by weight of Ebecryl 4740 with 30.45 parts of Isobornyl Acrylate (IBOA), 36.42 parts of Ebecryl 4683, 7.22 parts of Ebecryl 4513, 0.11 parts of Byk 306, 2.93 parts of Miwon SC1400, 2.93 parts of Trimethylolpropane Ethoxy Triacrylate (TMPEOTA), 0.88 parts Chigard 101 and were mixed until the resin solution became homogenous. 4.14 parts of Omnirad 819 was then added under high sheer mixing until the Omnirad 819 was completely dissolved. Once the Omnirad 819 was completely dissolved, a small portion of the formulation was then de-aerated under vacuum in a desiccator to measure viscosity and weight per gallon. The remainder of the formulation was de-aerated overnight.

This resin solution resulted in a weight per gallon of 8.92 lbs/gal and a viscosity of 960 at 5 RPM and 972 at 50 RPM both measured with a number 3 spindle on a Brookfield Synchro-Lectric Viscometer.

This coating is then cured into Microstructure Patterns per the description of WO2017063040A where by a 405 nm laser diode with a power output of up to 50 mW is used to cure structured riblets. The structured riblets can be of the following variety: sawtooth riblet geometry, scalloped riblet geometry, and a blade riblet geometry. A so-called bottom up curing is developed using the technique described in WO2017063040A.

TABLE 1

| Formulation | A | B | C | D | E | F |
|---|---|---|---|---|---|---|
| Ebecryl 4740 | 10.49 | 14.92 | 10.19 | 11.64 | 14.92 | 13.01 |
| IBOA | 10.00 | 30.45 | 9.72 | 11.10 | 30.45 | 26.55 |
| Disperbyk 111 | 2.91 | 0.00 | 2.83 | 3.23 | 0.00 | 2.91 |
| R960 TiO2 | 11.03 | 0.00 | 10.72 | 12.24 | 0.00 | 0.00 |
| Bayferrox 318 NM | 5.83 | 0.00 | 5.67 | 6.47 | 0.00 | 0.00 |
| IBOA | 11.41 | 0.00 | 11.09 | 12.67 | 0.00 | 0.00 |
| Ebecryl 4683 | 25.61 | 36.42 | 24.89 | 28.43 | 36.42 | 31.75 |
| Ebecryl 4513 | 5.08 | 7.22 | 4.94 | 5.65 | 7.22 | 6.29 |
| Byk 306 | 0.08 | 0.11 | 0.08 | 0.08 | 0.11 | 0.10 |
| Miwon SC1400 | 2.06 | 2.93 | 2.00 | 2.29 | 2.93 | 2.55 |
| TMPEOTA | 2.06 | 2.93 | 2.00 | 2.29 | 2.93 | 2.55 |
| Syloid Rad 2005 | 9.91 | 0.00 | 9.61 | 0.00 | 0.00 | 9.91 |
| Dalian 184 | 1.83 | 2.60 | 3.56 | 2.03 | 0.00 | 0.00 |
| Omnirad 2022 | 1.08 | 1.54 | 2.10 | 1.20 | 0.00 | 0.00 |
| Chigard 101 | 0.62 | 0.88 | 0.60 | 0.69 | 0.88 | 0.77 |
| Irgacure 819 | 0.00 | 0.00 | 0.00 | 0.00 | 4.14 | 3.61 |

Formulation F Clear Low Gloss

Utilizing a Stir-Pak Dual Shaft Mixer Model #SSM20 the following formulation 'F' as shown in Table 1 was manufactured:

A resin solution was made by taking 13.01 parts by weight of Ebecryl 4740 with 26.55 parts of Isobornyl Acrylate (IBOA), 2.91 parts of Disperbyk 111, 31.75 parts of Ebecryl 4683, 6.29 parts of Ebecryl 4513, 0.10 parts of Byk 306, 2.55 parts of Miwon SC1400 and 2.55 parts of Trimethylolpropane Ethoxy Triacrylate (TMPEOTA) were mixed until the resin solution became homogenous. After this resin solution became homogeneous, 9.91 parts of Syloid Rad 2005 was added to the above resin solution and dispersed until a 6+ grind value was measured on a Hegman grind gauge. Once the Syloid Rad 2005 grind was achieved 0.77 parts Chigard 101 and were mixed until the resin solution became homogenous. 3.61 parts of Omnirad 819 was then added under high sheer mixing until the Omnirad 819 was completely dissolved. Once the Omnirad 819 was completely dissolved, a small portion of the formulation was then de-aerated under vacuum in a desiccator to measure viscosity and weight per gallon. The remainder of the formulation was de-aerated overnight.

This resin solution resulted in a weight per gallon of 9.35lbs/gal and a viscosity of 6,240 at 5 RPM and 3,936 at 20 RPM both measured with a number 3 spindle on a Brookfield Synchro-Lectric Viscometer.

This coating is then cured into Microstructure Patterns per the description of WO2017063040A where by a 405 nm laser diode with a power output of up to 50 mW is used to cure structured riblets. The structured riblets can be of the following variety: sawtooth riblet geometry, scalloped riblet geometry, and a blade riblet geometry. A so-called bottom up curing is developed using the technique described in WO2017063040A.

Formulation G Gray Low Gloss

Utilizing a Premier Mill Corp. Laboratory Dispersator Series #2000 #50 the following formulation 'G' as shown in Table 2 was manufactured:

A resin solution was made by taking 10.49 parts by weight of Ebecryl 4740 with 21.41 parts of Isobornyl Acrylate (IBOA), and 2.91 parts of Disperbyk 111 and were mixed until the resin solution became homogenous. After this resin solution became homogenous, 11.03 parts of R960 $TiO_2$ (Titanium Dioxide) was added to the resin solution and dispersed until a 6+ grind value was measured on a Hegman grind gauge. To this pigmented resin solution, 5.83 parts of Bayferrox 318 NM was now added and the total solution was now dispersed until a 6+ grind value was measured on a Hegman grind gauge. Once both grinds were achieved, 25.61 parts of Ebecryl 4683, 5.08 parts of Ebecryl 4513, 0.08 parts of Byk 306, 2.06 parts of Miwon SC1400, and 2.06 parts of Trimethylolpropane Ethoxy Triacrylate (TMPEOTA), were now added to the above pigmented resin solution until the pigmented resin solution became homogeneous. After this pigmented resin solution became homogeneous, 9.91 parts of Syloid Rad 2005 was added to the above pigmented resin solution and dispersed until a 6+ grind value was measured on a Hegman grind gauge. Once the Syloid Rad 2005 grind was achieved, 0.62 parts of Chigard 101 is now added to the pigmented resin solution and dispersed until the resin solution becomes homogeneous. To this pigmented resin solution is now added, 2.91 parts of Omnirad 819 and dispersed until the Omnirad 819 was completely dissolved. Once the Omnirad 819 was completely dissolved, a small portion of the formulation was then de-aerated under vacuum in a desiccator to measure viscosity and weight per gallon. The remainder of the formulation was de-aerated overnight.

This resin solution resulted in a weight per gallon of 10.62 lbs/gal and a viscosity of 20,160 at 5 RPM and 10,290 at 20 RPM both measured with a number 4 spindle on a Brookfield Synchro-Lectric Viscometer.

This coating is then cured into Microstructure Patterns per the description of WO2017063040A where by a 405 nm laser diode with a power output of up to 50 mW is used to cure structured riblets. The structured riblets can be of the following variety: sawtooth riblet geometry, scalloped riblet geometry, and a blade riblet geometry. A so-called bottom up curing is developed using the technique described in WO2017063040A.

Formulation H Clear High Gloss Formulation

Utilizing a Stir-Pak Dual Shaft Mixer Model #SSM20 the following formulation 'H' as shown in Table 2 was manufactured:

A resin solution was made by taking 14.60 parts by weight of Ebecryl 4740 with 29.79 parts of Isobornyl Acrylate (IBOA), 35.63 parts of Ebecryl 4683, 7.06 parts of Ebecryl 4513, 0.11 parts of Byk 306, 2.87 parts of Miwon SC1400, 2.87 parts of Trimethylolpropane Ethoxy Triacrylate (TMPEOTA), 0.86 parts Chigard 101 and were mixed until the resin solution became homogenous. 6.21 parts of Omnirad 819 was then added under high sheer mixing until the Omnirad 819 was completely dissolved. Once the Omnirad 819 was completely dissolved, a small portion of the formulation was then de-aerated under vacuum in a desiccator to measure viscosity and weight per gallon. The remainder of the formulation was de-aerated overnight.

This resin solution resulted in a weight per gallon of 8.92 lbs/gal and a viscosity of 1,296 at 5 RPM and 1,306 at 50 RPM both measured with a number 3 spindle on a Brookfield Synchro-Lectric Viscometer.

This coating is then cured into Microstructure Patterns per the description of WO2017063040A where by a 405 nm laser diode with a power output of up to 50 mW is used to cure structured riblets. The structured riblets can be of the following variety: sawtooth riblet geometry, scalloped riblet geometry, and a blade riblet geometry. A so-called bottom up curing is developed using the technique described in WO2017063040A.

Formulation I Low gloss gray

Utilizing a Premier Mill Corp. Laboratory Dispersator Series #2000 #50 the following formulation T as shown in Table 3 was manufactured:

A resin solution was made by taking 10.49 parts by weight of Ebecryl 4738 with 21.41 parts of 4-tert-butylcyclohexyl acrylate (TBCH), and 2.91 parts of Disperbyk 111 and were mixed until the resin solution became homogenous. After this resin solution became homogenous, 11.03 parts of R960 $TiO_2$ (Titanium Dioxide) was added to the resin solution and dispersed until a 6+ grind value was measured on a Hegman grind gauge. To this pigmented resin solution, 5.83 parts of Raven 14 was now added and the total solution was now dispersed until a 6+ grind value was measured on a Hegman grind gauge. Once both grinds were achieved, 23.73 parts of Ebecryl 4683, 5.51 parts of Ebecryl 4513, 0.08 parts of Byk 306, 2.06 parts of Miwon SC1400, and 2.06 parts of Trimethylolpropane Ethoxy Triacrylate(TMPEOTA), were now added to the above pigmented resin solution until the pigmented resin solution became homogeneous. After this pigmented resin solution became homogeneous, 9.48 parts of Syloid Rad 2005 was added to the above pigmented resin solution and dispersed until a 6+ grind value was measured on a Hegman grind gauge. Once the Syloid Rad 2005 grind was achieved, 1.50 parts of Tinuvin 249 and 1.00 parts of Tinuvin 400 is now added to the pigmented resin solution and dispersed until the resin solution becomes homogeneous. To this pigmented resin solution is now added 2.91 parts of SpeedCure VLT and dispersed until the SpeedCure VLT was completely dissolved. Once the SpeedCure VLT was completely dissolved, a small portion of the formulation was then de-aerated under vacuum in a desiccator to measure viscosity and weight per gallon. The remainder of the formulation was de-aerated overnight.

This resin solution resulted in a weight per gallon of 10.32 lbs/gal and a viscosity of 42,000 at 5 RPM and 21,000 at 20 RPM both measured with a number 4 spindle on a Brookfield Synchro-Lectric Viscometer.

This coating is then cured into Microstructure Patterns per the description of WO2017063040A where by a 405 nm laser diode with a power output of up to 50 mW is used to cure structured riblets. The structured riblets can be of the following variety: sawtooth riblet geometry, scalloped riblet geometry, and a blade riblet geometry. A so-called bottom up curing is developed using the technique described in WO2017063040A.

TABLE 2

| Formulation | E | F |
| --- | --- | --- |
| Ebecryl 4740 | 10.49 | 14.60 |
| IBOA | 21.41 | 29.79 |
| Disperbyk 111 | 2.91 | 0.00 |
| R960 TiO2 | 11.03 | 0.00 |
| Bayferrox 318 NM | 5.83 | 0.00 |
| Ebecryl 4683 | 25.61 | 35.63 |
| Ebecryl 4513 | 5.08 | 7.06 |
| Byk 306 | 0.08 | 0.11 |
| Miwon SC1400 | 2.06 | 2.87 |
| TMPEOTA | 2.06 | 2.87 |
| Syloid Rad 2005 | 9.91 | 0.00 |
| Chigard 101 | 0.62 | 0.86 |
| Irgacure 819 | 2.91 | 6.21 |

Formulation J Gray Low Gloss

Utilizing a Premier Mill Corp. Laboratory Dispersator Series #2000 #50 the following formulation T as shown in Table 3 was manufactured:

A resin solution was made by taking 10.49 parts by weight of Ebecryl 4740 with 21.41 parts of Isobornyl Acrylate (IBOA), and 2.91 parts of Disperbyk 111 and were mixed until the resin solution became homogenous. After this resin solution became homogenous, 11.03 parts of R960 TiO2 (Titanium Dioxide) was added to the resin solution and dispersed until a 6+ grind value was measured on a Hegman grind gauge. To this pigmented resin solution, 5.83 parts of Bayferrox 318NM was now added and the total solution was now dispersed until a 6+ grind value was measured on a Hegman grind gauge. Once both grinds were achieved, 25.61 parts of Ebecryl 4683, 5.08 parts of Ebecryl 4513, 0.08 parts of Byk 306, 2.06 parts of Miwon SC1400, and 2.06 parts of Trimethylolpropane Ethoxy Triacrylate (TMPEOTA), were now added to the above pigmented resin solution until the pigmented resin solution became homogeneous. After this pigmented resin solution became homogeneous, 9.91 parts of Syloid Rad 2005 was added to the above pigmented resin solution and dispersed until a 6+ grind value was measured on a Hegman grind gauge. Once the Syloid Rad 2005 grind was achieved, 0.62 parts of Chigard 101 is now added to the pigmented resin solution and dispersed until the resin solution becomes homogeneous. To this pigmented resin solution is now added, 2.91 parts of Omnirad 784 and dispersed until the Omnirad 784 was completely dissolved. Once the Omnirad 784 was completely dissolved, a small portion of the formulation was then de-aerated under vacuum in a desiccator to measure viscosity and weight per gallon. The remainder of the formulation was de-aerated overnight.

This resin solution resulted in a weight per gallon of 10.73 lbs/gal and a viscosity of 17,520 at 5 RPM and 9,600 at 20 RPM both measured with a number 4 spindle on a Brookfield Synchro-Lectric Viscometer.

This coating is then cured into Microstructure Patterns per the description of WO2017063040A where by a 405 nm laser diode with a power output of up to 50 mW is used to cure structured riblets. The structured riblets can be of the following variety: sawtooth riblet geometry, scalloped riblet geometry, and a blade riblet geometry. A so-called bottom up curing is developed using the technique described in WO2017063040A.

Formulation K Gray Low Gloss

Utilizing a Premier Mill Corp. Laboratory Dispersator Series #2000 #50 the following formulation 'K' as shown in Table 3 was manufactured:

A resin solution was made by taking 10.49 parts by weight of Ebecryl 4738 with 21.41 parts of Isobornyl Acrylate (IBOA), and 2.91 parts of Disperbyk 111 and were mixed until the resin solution became homogenous. After this resin solution became homogenous, 11.03 parts of R960 TiO2 (Titanium Dioxide) was added to the resin solution and dispersed until a 6+ grind value was measured on a Hegman grind gauge. To this pigmented resin solution, 5.83 parts of Bayferrox 318NM was now added and the total solution was now dispersed until a 6+ grind value was measured on a Hegman grind gauge. Once both grinds were achieved, 25.61 parts of Ebecryl 4683, 5.08 parts of Ebecryl 4513, 0.08 parts of Byk 306, 2.06 parts of Miwon SC1400, and 2.06 parts of Trimethylolpropane Ethoxy Triacrylate (TMPEOTA), were now added to the above pigmented resin solution until the pigmented resin solution became homogeneous. After this pigmented resin solution became homogeneous, 9.91 parts of Syloid Rad 2005 was added to the above pigmented resin solution and dispersed until a 6+ grind value was measured on a Hegman grind gauge. Once the Syloid Rad 2005 grind was achieved, 0.62 parts of Chigard 101 is now added to the pigmented resin solution and dispersed until the resin solution becomes homogeneous. To this pigmented resin solution is now added, 2.91 parts of Omnirad 819 and dispersed until the Omnirad 819 was completely dissolved. Once the Omnirad 819 was completely dissolved, a small portion of the formulation was then de-aerated under vacuum in a desiccator to measure viscosity and weight per gallon. The remainder of the formulation was de-aerated overnight.

This resin solution resulted in a weight per gallon of 10.67 lbs/gal and a viscosity of 15,720 at 5 RPM and 8,490 at 20 RPM both measured with a number 4 spindle on a Brookfield Synchro-Lectric Viscometer.

This coating is then cured into Microstructure Patterns per the description of WO2017063040A where by a 405 nm laser diode with a power output of up to 50 mW is used to cure structured riblets. The structured riblets can be of the following variety: sawtooth riblet geometry, scalloped riblet geometry, and a blade riblet geometry. A so-called bottom up curing is developed using the technique described in WO2017063040A.

Formulation L Clear High Gloss

Utilizing a Stir-Pak Dual Shaft Mixer Model #SSM20 the following formulation 'L' as shown in Table 3 was manufactured:

A resin solution was made by taking 14.92 parts by weight of Ebecryl 4738 with 30.45 parts of Isobornyl Acrylate (IBOA), 36.42 parts of Ebecryl 4683, 7.22 parts of Ebecryl 4513, 0.11 parts of Byk 306, 2.93 parts of Miwon SC1400, 2.93 parts of Trimethylolpropane Ethoxy Triacrylate (TMPEOTA), 0.88 parts Chigard 101 and were mixed until the resin solution became homogenous. 4.41 parts of Omnirad 819 was then added under high sheer mixing until the Omnirad 819 was completely dissolved. Once the Omnirad 819 was completely dissolved, a small portion of the formulation was then de-aerated under vacuum in a desiccator to measure viscosity and weight per gallon. The remainder of the formulation was de-aerated overnight.

This resin solution resulted in a weight per gallon of 8.95 lbs/gal and a viscosity of 1,128 at 5 RPM and 1,255 at 50 RPM both measured with a number 3 spindle on a Brookfield Synchro-Lectric Viscometer.

This coating is then cured into Microstructure Patterns per the description of WO2017063040A where by a 405 nm laser diode with a power output of up to 50 mW is used to cure structured riblets. The structured riblets can be of the following variety: sawtooth riblet geometry, scalloped riblet geometry, and a blade riblet geometry. A so-called bottom up curing is developed using the technique described in WO2017063040A.

Formulation M Gray Low Gloss

Utilizing a Premier Mill Corp. Laboratory Dispersator Series #2000 #50 the following formulation 'M' as shown in Table 3 was manufactured:

A resin solution was made by taking 10.49 parts by weight of Ebecryl 4738 with 21.41 parts of 4-tert-butylcyclohexyl acrylate (TBCH), and 2.91 parts of Disperbyk 111 and were mixed until the resin solution became homogenous. After this resin solution became homogenous, 11.03 parts of R960 TiO₂ (Titanium Dioxide) was added to the resin solution and dispersed until a 6+ grind value was measured on a Hegman grind gauge. To this pigmented resin solution, 5.83 parts of Bayferrox 318 NM was now added and the total solution was now dispersed until a 6+ grind value was measured on a Hegman grind gauge. Once both grinds were achieved, 23.73 parts of Ebecryl 4683, 5.51 parts of Ebecryl 4513, 0.08 parts of Byk 306, 2.06 parts of Miwon SC1400, and 2.06 parts of TMPEOTA, were now added to the above pigmented resin solution until the pigmented resin solution became homogeneous. After this pigmented resin solution became homogeneous, 9.48 parts of Syloid Rad 2005 was added to the above pigmented resin solution and dispersed until a 6+ grind value was measured on a Hegman grind gauge. Once the Syloid Rad 2005 grind was achieved, 2.91 parts of SpeedCure VLT was now added to the above pigmented resin solution and dispersed until the SpeedCure VLT was completely dissolved. Once the SpeedCure VLT was completely dissolved, 1.50 parts of Tinuvin 249 and 1.00 parts of Tinuvin 400 were now added to the above pigmented resin solution and then fully dispersed. Once the Tinuvin 249 and Tinuvin 400 were fully dispersed, a small portion of the formulation was then de-aerated under vacuum in a desiccator to measure viscosity and weight per gallon. The remainder of the formulation was de-aerated overnight.

This resin solution resulted in a weight per gallon of 10.57 lbs/gal and a viscosity of 10,560 at 5 RPM and 6,990 at 20 RPM both measured with a number 4 spindle on a Brookfield Synchro-Lectric Viscometer.

This coating is then cured into Microstructure Patterns per the description of WO2017063040A where by a 405 nm laser diode with a power output of up to 50 mW is used to cure structured riblets. The structured riblets can be of the following variety: sawtooth riblet geometry, scalloped riblet geometry, and a blade riblet geometry. A so-called bottom up curing is developed using the technique described in WO2017063040A.

TABLE 3

| Formulation | I | J | K | L | M | N |
|---|---|---|---|---|---|---|
| Ebecryl 4740 | 0.00 | 10.49 | 0.00 | 0.00 | 0.00 | 0.00 |
| Ebecryl 4738 | 10.49 | 0.00 | 10.49 | 14.92 | 10.49 | 15.06 |
| IBOA | 0.00 | 21.41 | 21.41 | 30.45 | 0.00 | 0.00 |
| TBCH | 21.41 | 0.00 | 0.00 | 0.00 | 21.41 | 30.72 |
| Disperbyk 111 | 2.91 | 2.91 | 2.91 | 0.00 | 2.91 | 0.00 |
| R960 TiO2 | 11.03 | 11.03 | 11.03 | 0.00 | 11.03 | 0.00 |
| Bayferrox 318 NM | 0.00 | 5.83 | 5.83 | 0.00 | 5.83 | 0.00 |
| Raven 14 | 5.83 | 0.00 | 0.00 | 0.00 | 0.00 | 0.00 |

TABLE 3-continued

| Formulation | I | J | K | L | M | N |
|---|---|---|---|---|---|---|
| Ebecryl 4683 | 23.73 | 25.61 | 25.61 | 36.42 | 23.73 | 34.04 |
| Ebecryl 4513 | 5.51 | 5.08 | 5.08 | 7.22 | 5.51 | 7.91 |
| Byk 306 | 0.08 | 0.08 | 0.08 | 0.11 | 0.08 | 0.11 |
| Miwon SC1400 | 2.06 | 2.06 | 2.06 | 2.93 | 2.06 | 2.95 |
| TMPEOTA | 2.06 | 2.06 | 2.06 | 2.93 | 2.06 | 2.95 |
| Syloid Rad 2005 | 9.48 | 9.91 | 9.91 | 0.00 | 9.48 | 0.00 |
| Chigard 101 | 0.00 | 0.62 | 0.62 | 0.88 | 0.00 | 0.00 |
| Tinuvin 249 | 1.50 | 0.00 | 0.00 | 0.00 | 1.50 | 2.15 |
| Tinuvin 400 | 1.00 | 0.00 | 0.00 | 0.00 | 1.00 | 1.43 |
| Irgacure 819 | 0.00 | 0.00 | 2.91 | 4.14 | 0.00 | 0.00 |
| SpeedCure VLT | 2.91 | 0.00 | 0.00 | 0.00 | 2.91 | 2.68 |
| Omnirad 784 | 0.00 | 2.91 | 0.00 | 0.00 | 0.00 | 0.00 |

Formulation N Clear High Gloss

Utilizing a Stir-Pak Dual Shaft Mixer Model #SSM20 the following formulation 'N' as shown in Table 3 was manufactured:

A resin solution was made by taking 15.06 parts by weight of Ebecryl 4738 with 30.72 4-tert-butylcyclohexyl acrylate (TBCH), 34.04 parts of Ebecryl 4683, 7.91 parts of Ebecryl 4513, 0.11 parts of Byk 306, 2.95 parts of Miwon SC1400, 2.95 parts of Trimethylolpropane Ethoxy Triacrylate (TMPEOTA), and were mixed until the resin solution became homogenous. 2.68 parts of SpeedCure VLT was then added under high sheer mixing until the SpeedCure VLT was completely dissolved. Once the SpeedCure VLT was completely dissolved, 2.15 parts of Tinuvin 249 and 1.43 parts of Tinuvin 400 were now added to the above resin solution and then fully dispersed. After the Tinuvin 249 and Tinuvin 400 were fully dispersed, a small portion of the formulation was then de-aerated under vacuum in a desiccator to measure viscosity and weight per gallon. The remainder of the formulation was de-aerated overnight.

This resin solution resulted in a weight per gallon of 8.85 lbs/gal and a viscosity of 1,344 at 5 RPM and 1,351 at 50 RPM both measured with a number 3 spindle on a Brookfield Synchro-Lectric Viscometer.

This coating is then cured into Microstructure Patterns per the description of WO2017063040A where by a 405 nm laser diode with a power output of up to 50 mW is used to cure structured riblets. The structured riblets can be of the following variety: sawtooth riblet geometry, scalloped riblet geometry, and a blade riblet geometry. A so-called bottom up curing is developed using the technique described in WO2017063040A.

TABLE 4

| Formulation | O | P | Q | R | S |
|---|---|---|---|---|---|
| Ebecryl 4738 | 14.77 | 14.77 | 14.77 | 14.77 | 13.43 |
| TBCH | 30.15 | 30.15 | 30.15 | 30.15 | 27.40 |
| Ebecryl 4683 | 36.05 | 36.05 | 36.05 | 36.05 | 32.77 |
| Ebecryl 4513 | 7.15 | 7.15 | 7.15 | 7.15 | 6.50 |
| Byk 306 | 0.11 | 0.11 | 0.11 | 0.11 | 0.10 |
| Miwon SC1400 | 2.90 | 2.90 | 2.90 | 2.90 | 2.64 |
| TMPEOTA | 2.90 | 2.90 | 2.90 | 2.90 | 2.64 |
| Chigard 101 | 0.87 | 0.87 | 0.87 | 0.87 | 0.79 |
| Irgacure 819 | 4.10 | 4.10 | 4.10 | 4.10 | 3.73 |
| CN4002 | 1.00 | 0.00 | 0.00 | 0.00 | 0.00 |
| Poly-Fox PF 3320 | 0.00 | 1.00 | 0.00 | 0.00 | 0.00 |
| Ebecryl 8110 | 0.00 | 0.00 | 1.00 | 0.00 | 0.00 |
| Fluoracryl 7298 | 0.00 | 0.00 | 0.00 | 1.00 | 0.00 |
| NTX13906 | 0.00 | 0.00 | 0.00 | 0.00 | 10.00 |

Formulation O Fluorinated Clear High Gloss

Utilizing a Stir-Pak Dual Shaft Mixer Model #SSM20 the following formulation 'O' as shown in Table 4 was manufactured:

A resin solution was made by taking 14.77 parts by weight of Ebecryl 4738 with 30.15 parts of 4-tert-butylcyclohexyl acrylate (TBCH), 36.05 parts of Ebecryl 4683, 7.15 parts of Ebecryl 4513, 0.11 parts of Byk 306, 2.90 parts of Miwon SC1400, 2.90 parts of TMPEOTA, 1.00 parts of CN4002, and 0.87 parts of Chigard 101 and were mixed until the resin solution became homogenous. After this resin solution became homogenous, 4.10 parts of Omnirad 819 was then added under high sheer mixing until the Omnirad 819 was completely dissolved. After the Omnirad 819 was completely dissolved, a small portion of the formulation was then de-aerated under vacuum in a desiccator to measure viscosity and weight per gallon. The remainder of the formulation was de-aerated overnight.

This resin solution resulted in a weight per gallon of 8.81 lbs/gal and a viscosity of 1,272 at 5 RPM and 1,282 at 50 RPM both measured with a number 3 spindle on a Brookfield Synchro-Lectric Viscometer.

This coating is then cured into Microstructure Patterns per the description of WO2017063040A where by a 405 nm laser diode with a power output of up to 50 mW is used to cure structured riblets. The structured riblets can be of the following variety: sawtooth riblet geometry, scalloped riblet geometry, and a blade riblet geometry. A so-called bottom up curing is developed using the technique described in WO2017063040A.

Formulation P Fluorinated Clear High Gloss

Utilizing a Stir-Pak Dual Shaft Mixer Model #SSM20 the following formulation 'P' as shown in Table 4 was manufactured:

A resin solution was made by taking 14.77 parts by weight of Ebecryl 4738 with 30.15 parts of 4-tert-butylcyclohexyl acrylate (TBCH), 36.05 parts of Ebecryl 4683, 7.15 parts of Ebecryl 4513, 0.11 parts of Byk 306, 2.90 parts of Miwon SC1400, 2.90 parts of TMPEOTA, 1.00 parts of Poly-Fox PF 3320, and 0.87 parts of Chigard 101 and were mixed until the resin solution became homogenous. After this resin solution became homogenous, 4.10 parts of Omnirad 819 was then added under high sheer mixing until the Omnirad 819 was completely dissolved. After the Omnirad 819 was completely dissolved, a small portion of the formulation was then de-aerated under vacuum in a desiccator to measure viscosity and weight per gallon. The remainder of the formulation was de-aerated overnight.

This resin solution resulted in a weight per gallon of 8.77 lbs/gal and a viscosity of 1,440 at 5 RPM and 1,450 at 50 RPM both measured with a number 3 spindle on a Brookfield Synchro-Lectric Viscometer.

This coating is then cured into Microstructure Patterns per the description of WO2017063040A where by a 405 nm laser diode with a power output of up to 50 mW is used to cure structured riblets. The structured riblets can be of the following variety: sawtooth riblet geometry, scalloped riblet geometry, and a blade riblet geometry. A so-called bottom up curing is developed using the technique described in WO2017063040A.

Formulation Q Fluorinated Clear High Gloss

Utilizing a Stir-Pak Dual Shaft Mixer Model #SSM20 the following formulation 'Q' as shown in Table 4 was manufactured:

A resin solution was made by taking 14.77 parts by weight of Ebecryl 4738 with 30.15 parts of 4-tert-butylcyclohexyl acrylate (TBCH), 36.05 parts of Ebecryl 4683, 7.15 parts of Ebecryl 4513, 0.11 parts of Byk 306, 2.90 parts of Miwon SC1400, 2.90 parts of TMPEOTA, 1.00 parts of Ebecryl 8110, and 0.87 parts of Chigard 101 and were mixed until the resin solution became homogenous. After this resin solution became homogenous, 4.10 parts of Omnirad 819 was then added under high sheer mixing until the Omnirad 819 was completely dissolved. After the Omnirad 819 was completely dissolved, a small portion of the formulation was then de-aerated under vacuum in a desiccator to measure viscosity and weight per gallon. The remainder of the formulation was de-aerated overnight.

This resin solution resulted in a weight per gallon of 8.80 lbs/gal and a viscosity of 1,224 at 5 RPM and 1,258 at 50 RPM both measured with a number 3 spindle on a Brookfield Synchro-Lectric Viscometer.

This coating is then cured into Microstructure Patterns per the description of WO2017063040A where by a 405 nm laser diode with a power output of up to 50 mW is used to cure structured riblets. The structured riblets can be of the following variety: sawtooth riblet geometry, scalloped riblet geometry, and a blade riblet geometry. A so-called bottom up curing is developed using the technique described in WO2017063040A.

Formulation R Fluorinated Clear High Gloss

Utilizing a Stir-Pak Dual Shaft Mixer Model #SSM20 the following formulation 'R' as shown in Table 4 was manufactured:

A resin solution was made by taking 14.77 parts by weight of Ebecryl 4738 with 30.15 parts of 4-tert-butylcyclohexyl acrylate (TBCH), 36.05 parts of Ebecryl 4683, 7.15 parts of Ebecryl 4513, 0.11 parts of Byk 306, 2.90 parts of Miwon SC1400, 2.90 parts of TMPEOTA, 1.00 parts of Fluoracryl 7298, and 0.87 parts of Chigard 101 and were mixed until the resin solution became homogenous. After this resin solution became homogenous, 4.10 parts of Omnirad 819 was then added under high sheer mixing until the Omnirad 819 was completely dissolved. After the Omnirad 819 was completely dissolved, a small portion of the formulation was then de-aerated under vacuum in a desiccator to measure viscosity and weight per gallon. The remainder of the formulation was de-aerated overnight.

This resin solution resulted in a weight per gallon of 8.79 lbs/gal and a viscosity of 1,296 at 5 RPM and 1,306 at 50 RPM both measured with a number 3 spindle on a Brookfield Synchro-Lectric Viscometer.

This coating is then cured into Microstructure Patterns per the description of WO2017063040A where by a 405 nm laser diode with a power output of up to 50 mW is used to cure structured riblets. The structured riblets can be of the following variety: sawtooth riblet geometry, scalloped riblet geometry, and a blade riblet geometry. A so-called bottom up curing is developed using the technique described in WO2017063040A.

Formulation S Fluorinated Clear High Gloss

Utilizing a Stir-Pak Dual Shaft Mixer Model #SSM20 the following formulation 'S' as shown in Table 4 was manufactured:

A resin solution was made by taking 13.43 parts by weight of Ebecryl 4738 with 27.40 parts of 4-tert-butylcyclohexyl acrylate (TBCH), 32.77 parts of Ebecryl 4683, 6.50 parts of Ebecryl 4513, 0.10 parts of Byk 306, 2.64 parts of Miwon SC1400, 2.64 parts of TMPEOTA, 10.00 parts of NTX13906, and 0.79 parts of Chigard 101 and were mixed until the resin solution became homogenous. After this resin solution became homogenous, 3.73 parts of Omnirad 819 was then added under high sheer mixing until the Omnirad 819 was completely dissolved. After the Omnirad 819 completely dissolved, a small portion of the formulation was then de-aerated under vacuum in a desiccator to measure viscosity and weight per gallon. The remainder of the formulation was de-aerated overnight.

This resin solution resulted in a weight per gallon of 9.07 lbs/gal and a viscosity of 1,848 at 5 RPM and 1,738 at 50 RPM both measured with a number 3 spindle on a Brookfield Synchro-Lectric Viscometer.

This coating is then cured into Microstructure Patterns per the description of WO2017063040A where by a 405 nm laser diode with a power output of up to 50 mW is used to cure structured riblets. The structured riblets can be of the following variety: sawtooth riblet geometry, scalloped riblet geometry, and a blade riblet geometry. A so-called bottom up curing is developed using the technique described in WO2017063040A.

Formulation S contact angle measurements were performed using a standard goniometer (Model 250 F4 Series, Rame-Hart Instrument Co.) with DROPimage Advanced (Version 2.7) software. A 10-μL sessile droplet was released from the syringe to the surface and was imaged and analyzed resulting in a contact angle 143 degrees +/−4 degrees. This contact angle result falls within the range of a superhydrophobic surface that will exhibit a surface that will remain clean during the typical performance of an aerospace coating. For comparison purposes Formulation E showed non-superhydrophobic characteristics of 110 degrees +/−11 degrees.

It should be understood that while this disclosure has been described herein in terms of specific, preferred embodiments set forth in detail, such embodiments are presented by way of illustration of the general principles of the disclosure, and the disclosure is not necessarily limited thereto. Certain modifications and variations in any given material, process step or chemical formula will be readily apparent to those skilled in the art without departing from the true spirit and scope of the present disclosure, and all such modifications and variations should be considered within the scope of the claims that follow.

What is claimed is:

1. A composition comprising:
   an unsaturated (meth)acrylate polymer or oligomer in an amount of about 25 to about 45 percent by weight, the unsaturated (meth)acrylate polymer or oligomer is a reaction product of a first composition having:
      an organic polyisocyanate;
      a polyol having a number average molecular weight of about 600 to about 4000 g/mol; and
      at least one of: (1) a hydroxyl-functional (meth)acrylate and (2) an unsaturated (meth)acrylate polyol based on a polyester, a polyether, a polythioether, a polyacetal, a polycarbonate, a dimer fatty alcohol and/or an esteramide, in each case with a number average molecular weight of 400 to 8000 g/mol, at an isocyanate to hydroxyl equivalent ratio of from 0.5:1 to 1:0.5;
   an allophanate unsaturated urethane (meth)acrylate in an amount of about 5 to about 25 percent by weight;
   a lactone-containing (meth)acrylate in an amount of about 2 to about 12 percent by weight;
   a first reactive diluent in an amount of about 15 to about 50 percent by weight, the first reactive diluent having a monomer;
   a surfactant in an amount up to about 0.3 percent by weight;
   an adhesion promoter in an amount of about 1 to about 5 percent by weight;
   a second reactive diluent in an amount of about 1 to about 5 percent by weight, the reactive diluent having a phosphoric acid ester;
   a light stabilizer in an amount of about 0.5 to about 2 percent by weight; and
   a photoinitiator in an amount of about 0.5 to about 15 percent by weight.

2. The composition of claim 1, further comprising a first additive of a fluorinated urethane acrylate oligomer, a fluorinated acrylate oligomer, a fluorinated polyether, or a fluorinated oxetane oligomer.

3. The composition of claim 2, wherein the first additive is present in an amount of about 0.5 to about 10 percent by weight.

4. The composition of claim 3, wherein the reaction product includes an unsaturated aliphatic urethane acrylate.

5. The composition of claim 4, wherein the allophanate unsaturated urethane (meth)acrylate includes an unsaturated aliphatic allophanate urethane acrylate.

6. The composition of claim 5, wherein the lactone-containing (meth)acrylate includes an unsaturated aliphatic urethane acrylate based on a hydroxyl functional lactone ester (meth) acrylate.

7. The composition of claim 6, wherein the first reactive diluent includes an isobornyl acrylate or 4-tert-butyl cyclohexyl acrylate.

8. The composition of claim 7, wherein the surfactant includes a wetting and dispersing copolymer with an acidic group.

9. The composition of claim 8, wherein the adhesion promoter includes a phosphoric acid ester having a photopolymerizable unsaturated bond.

10. The composition of claim 9, wherein the second reactive diluent includes Trimethylolpropane ethoxy triacrylate.

11. The composition of claim 10, wherein the light stabilizer includes an acidic liquid hinder amine light stabilizer, liquid non-basic hindered amine light stabilizer (HALS), or liquid hydroxyphenyl-triazine (HPT) UV absorber.

12. The composition of claim 11, wherein the photo initiator includes Bis Acyl Phosphine (BAPO) and fluorinated diaryl-bis-cyclopentadienyl titanium complex.

13. The composition of claim 1, further comprising a pigment.

14. The composition of claim 13, wherein the pigment includes iron oxide, rutile $TiO_2$, or carbon black.

15. The composition of claim 1, further comprising a dispersant.

16. The composition of claim 15, wherein the dispersant includes a copolymer with acidic groups.

17. The composition of claim 1, wherein:
   the reaction product is in an amount of about 32 to about 38 percent by weight;
   the allophanate unsaturated urethane (meth)acrylate is in an amount of about 13 to about 15 percent by weight;
   the lactone-containing (meth)acrylate is in an amount of about 6 to about 8 percent by weight;
   the first reactive diluent is in an amount of about 26 to about 31 percent by weight;
   the adhesion promoter is in an amount of about 1 to about 4 percent by weight;
   the second reactive diluent is in an amount of about 1 to about 4 percent by weight; and
   the photoinitiator is in an amount of about 0.5 to about 5 percent by weight.

18. A method of making a one component UV curable coating, comprising:
applying a composition to a substrate at a thickness of at least 0.1 mils, the composition having:
an unsaturated (meth)acrylate polymer or oligomer in an amount of about 25 to about 45 percent by weight, the unsaturated (meth)acrylate polymer or oligomer is a reaction product of a first composition having:
an organic polyisocyanate;
a polyol having a number average molecular weight of about 600 to about 4000 g/mol; and
at least one of: (1) a hydroxyl-functional (meth) acrylate and (2) an unsaturated (meth)acrylate polyol based on a polyester, a polyether, a polythioether, a polyacetal, a polycarbonate, a dimer fatty alcohol and/or an esteramide, in each case with a number average molecular weight of 400 to 8000 g/mol, at an isocyanate to hydroxyl equivalent ratio of from 0.5:1 to 1:0.5;
an allophanate unsaturated urethane (meth)acrylate in an amount of about 5 to about 25 percent by weight;
a lactone-containing (meth)acrylate in an amount of about 2 to about 12 percent by weight;
a first reactive diluent in an amount of about 15 to about 50 percent by weight, the first reactive diluent having a monomer;
a surfactant in an amount up to about 0.3 percent by weight;
an adhesion promoter in an amount of about 1 to about 5 percent by weight;
a second reactive diluent in an amount of about 1 to about 5 percent by weight, the reactive diluent having a phosphoric acid ester;
a light stabilizer in an amount of about 0.5 to about 2 percent by weight; and
a photoinitiator in an amount of about 0.5 to about 15 percent by weight; and
exposing the composition to actinic radiation without using any oxygen inhibition mitigation techniques to produce a cured film.

19. The method of claim 18, wherein:
the allophanate unsaturated urethane (meth)acrylate includes an unsaturated aliphatic allophanate urethane acrylate;
the lactone-containing (meth)acrylate includes an unsaturated aliphatic urethane acrylate based on a hydroxyl functional lactone ester (meth) acrylate;
the first reactive diluent includes an isobornyl acrylate or 4-tert-butyl cyclohexyl acrylate;
the surfactant includes a wetting and dispersing copolymer with an acidic group;
the adhesion promoter includes a phosphoric acid ester having a photopolymerizable unsaturated bond;
the second reactive diluent includes Trimethylolpropane ethoxy triacrylate;
the light stabilizer includes an acidic liquid hinder amine light stabilizer, liquid non-basic hindered amine light stabilizer (HALS), or liquid hydroxyphenyl-triazine (HPT) UV absorber; and
the photo initiator includes Bis Acyl Phosphine (BAPO) and fluorinated diaryl-bis-cyclopentadienyl titanium complex.

20. The method of claim 18, wherein:
the reaction product is in an amount of about 32 to about 38 percent by weight;
the allophanate unsaturated urethane (meth)acrylate is in an amount of about 13 to about 15 percent by weight;
the lactone-containing (meth)acrylate is in an amount of about 6 to about 8 percent by weight;
the first reactive diluent is in an amount of about 26 to about 31 percent by weight;
the adhesion promoter is in an amount of about 1 to about 4 percent by weight;
the second reactive diluent is in an amount of about 1 to about 4 percent by weight; and
the photoinitiator is in an amount of about 0.5 to about 5 percent by weight.

* * * * *